United States Patent
Hiller

(10) Patent No.: US 11,469,941 B2
(45) Date of Patent: Oct. 11, 2022

(54) CONFIGURATION FOR IOT DEVICE SETUP

(71) Applicant: BLX.io LLC, Colts Neck, NJ (US)

(72) Inventor: Ronald Hiller, Colts Neck, NJ (US)

(73) Assignee: BLX.io LLC, Colts Neck, NJ (US)

(*) Notice: Subject to any disclaimer, the term of this patent is extended or adjusted under 35 U.S.C. 154(b) by 730 days.

(21) Appl. No.: 16/158,213

(22) Filed: Oct. 11, 2018

(65) Prior Publication Data
US 2019/0116087 A1 Apr. 18, 2019

Related U.S. Application Data

(60) Provisional application No. 62/572,317, filed on Oct. 13, 2017.

(51) Int. Cl.
*H04L 41/0806* (2022.01)
*H04W 8/18* (2009.01)
(Continued)

(52) U.S. Cl.
CPC .......... *H04L 41/0806* (2013.01); *H04L 67/12* (2013.01); *H04L 67/303* (2013.01);
(Continued)

(58) Field of Classification Search
CPC ....... H04W 4/50; H04W 76/15; H04W 76/11; H04W 12/003; H04W 4/70; H04W 8/22;
(Continued)

(56) References Cited

U.S. PATENT DOCUMENTS 7,783,613 B2 * 8/2010 Gupta ................. H04L 67/5651
707/693
9,913,143 B1 * 3/2018 Roche ................... H04W 12/50
(Continued)

FOREIGN PATENT DOCUMENTS

CN 103959285 A * 7/2014 ........... G06F 16/954
WO WO-2012026932 A1 * 3/2012 ............ H04W 12/06
(Continued)

OTHER PUBLICATIONS

T. N. E. Steane and P. J. Radcliffe, A Universal IOT Joining Protocol for DIY Applications 27th International Telecommunication Networks and Applications Conference (ITNAC), IEEE 2017 (Year: 2017).*

*Primary Examiner* — Emmanuel L Moise
*Assistant Examiner* — Robert A Shaw
(74) *Attorney, Agent, or Firm* — Mintz Levin Cohn Ferris Glovsky and Popeo, P.C.

(57) ABSTRACT

A system for (pre)configuration for IoT device setup is provided. In some implementations, the system performs operations comprising receiving, by an intermediary device (e.g., smartphone) and from a server (e.g., cloud computing system), a configuration profile for setup of an IoT device. The configuration profile can include an identifier (e.g., SSID) of a first wireless network (e.g., Wi-Fi and/or WLAN network). The operations can further comprise establishing, by the intermediary device, a connection to a second wireless network provided by the IoT device. Thereafter, the operations can further comprise providing, by the intermediary device and over the second wireless network, the configuration profile to the IoT device, wherein providing the configuration profile to the IoT device causes the Internet of Things device to establish (e.g., automatically) a connection to the first wireless network. Related systems, methods, and articles of manufacture are also described.

19 Claims, 20 Drawing Sheets

(51) Int. Cl.
*H04W 8/22* (2009.01)
*H04W 76/15* (2018.01)
*H04L 67/303* (2022.01)
*H04L 67/12* (2022.01)
*H04W 76/11* (2018.01)
*H04W 8/24* (2009.01)
*H04W 84/12* (2009.01)
*H04W 24/02* (2009.01)
*H04W 48/18* (2009.01)

(52) U.S. Cl.
CPC .............. *H04W 8/183* (2013.01); *H04W 8/22* (2013.01); *H04W 8/24* (2013.01); *H04W 76/11* (2018.02); *H04W 76/15* (2018.02); *H04W 24/02* (2013.01); *H04W 48/18* (2013.01); *H04W 84/12* (2013.01)

(58) Field of Classification Search
CPC .... H04W 8/183; H04W 8/24; H04L 41/0806; H04L 67/12; H04L 67/303
See application file for complete search history.

(56) References Cited

U.S. PATENT DOCUMENTS

| | | | | |
|---|---|---|---|---|
| 10,148,495 | B1* | 12/2018 | Oczkowski | H04L 69/14 |
| 10,149,335 | B2* | 12/2018 | Gujral | H04W 76/14 |
| 10,172,180 | B1* | 1/2019 | Huang | H04L 69/28 |
| 10,536,211 | B2* | 1/2020 | Leroux | H04W 76/19 |
| 2006/0037072 | A1* | 2/2006 | Rao | H04L 63/0236 |
| | | | | 726/14 |
| 2007/0275701 | A1* | 11/2007 | Jonker | H04W 48/16 |
| | | | | 455/414.1 |
| 2009/0210807 | A1* | 8/2009 | Xiao | G06F 16/9566 |
| | | | | 709/222 |
| 2010/0302958 | A1* | 12/2010 | Wietfeldt | H04W 76/15 |
| | | | | 370/252 |
| 2011/0126267 | A1* | 5/2011 | Sathish | G06F 16/9577 |
| | | | | 726/4 |
| 2013/0212212 | A1* | 8/2013 | Addepalli | G06F 9/4856 |
| | | | | 709/217 |
| 2013/0286889 | A1* | 10/2013 | Cherian | H04W 12/50 |
| | | | | 370/254 |
| 2015/0023183 | A1* | 1/2015 | Ilsar | H04W 48/16 |
| | | | | 370/244 |
| 2015/0031346 | A1* | 1/2015 | Duncan | H04W 8/22 |
| | | | | 455/418 |
| 2015/0071052 | A1* | 3/2015 | Hershberg | H04W 24/04 |
| | | | | 370/216 |
| 2015/0071216 | A1* | 3/2015 | Ilsar | H04W 48/12 |
| | | | | 370/329 |
| 2015/0106887 | A1* | 4/2015 | Aslund | H04W 12/06 |
| | | | | 726/5 |
| 2015/0124968 | A1* | 5/2015 | Scott | H04W 12/50 |
| | | | | 380/270 |
| 2015/0146706 | A1* | 5/2015 | Goluboff | H04W 36/03 |
| | | | | 370/338 |
| 2015/0223006 | A1* | 8/2015 | Hornung | H04W 4/50 |
| | | | | 455/418 |
| 2016/0037436 | A1* | 2/2016 | Spencer | H04W 12/08 |
| | | | | 370/338 |
| 2016/0037445 | A1* | 2/2016 | Barathalwar | H04W 4/025 |
| | | | | 370/338 |
| 2016/0057696 | A1* | 2/2016 | Montemurro | H04L 67/2814 |
| | | | | 370/338 |
| 2016/0080467 | A1* | 3/2016 | Jenkins | G06F 16/954 |
| | | | | 709/218 |
| 2017/0094706 | A1* | 3/2017 | Kim | H04L 67/141 |
| 2017/0279653 | A1* | 9/2017 | Gilson | H04W 12/068 |
| 2018/0007140 | A1* | 1/2018 | Brickell | H04W 12/00 |
| 2018/0227387 | A1* | 8/2018 | Gersons | H04L 67/535 |
| 2018/0343552 | A1* | 11/2018 | Park | H04W 4/60 |
| 2018/0359251 | A1* | 12/2018 | Corcoran | H04L 9/3218 |
| 2019/0190782 | A1* | 6/2019 | Panje | H04L 63/083 |
| 2019/0200405 | A1* | 6/2019 | Gupta | H04W 76/11 |
| 2019/0268398 | A1* | 8/2019 | Suriarachchi | H04L 65/1101 |
| 2020/0169460 | A1* | 5/2020 | Bartlett | H04W 8/18 |
| 2020/0274935 | A1* | 8/2020 | Lekontsev | H04L 61/50 |

FOREIGN PATENT DOCUMENTS

| | | | | |
|---|---|---|---|---|
| WO | WO-2016003311 | A  * | 1/2016 | ............ H04W 12/50 |
| WO | WO-2016003311 | A1 * | 1/2016 | ............ H04W 12/50 |

* cited by examiner

700

710 — Receive data associated with a first wireless network

720 — Generate a configuration profile for establishing a connection from at least one IoT device to the first wireless network

730 — Receive, from an intermediary device, a request to initiate establishment of the connection

740 — Provide, in response to the request, the configuration profile for access by the intermediary device

750 — Receive a message comprising identification and/or capability information for the at least one IoT device

760 — Receive information indicative of a successful establishment of the connection

770 — Transmit at least one packet of data to the at least one IoT device

810 — Provide, to a server, a request for a configuration profile for setup of an Internet of Things device over a first wireless network

820 — Receive the configuration profile from the server

830 — Establish a connection to a second wireless network provided by the Internet of Things device

840 — Receive, from the Internet of Things device, communication settings and/or capabilities for the Internet of Things device

850 — Provide, over the second wireless network, the configuration profile to the Internet of Things device

860 — Determine that the second wireless network is unavailable

870 — Transmit, to the server, the communication settings and/ or capabilities for the Internet of Things device

FIG. 8

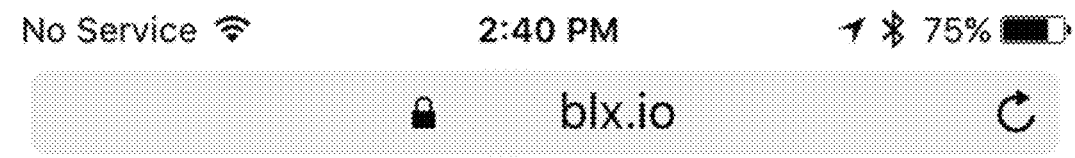

Connected to: cloud
Time: 09/13/2017 18:40:46
Host: p

---

Step 2: Now have the configuration from the server.

The following step isn't hard, but it's best to read it through before starting.

Press the Home button and switch to the Settings app, then select Wi-Fi.

Select the new wireless network that starts with "BLX-" followed by some letters/numbers", something like BLX-32cd. Wait until the checkmark appears.

Then, press the Home button, then start Safari, and you'll be back at this page.

FIG. 13

CONFIGURATION FOR IOT DEVICE SETUP

CROSS REFERENCE TO RELATED APPLICATIONS

This application claims priority to U.S. Provisional Patent Application No. 62/571,317 filed on Oct. 13, 2017 and entitled "CONFIGURATION FOR IOT DEVICE SETUP," the disclosure of which is incorporated herein by reference in its entirety.

TECHNICAL FIELD

The subject matter described herein relates to Internet of Things (IoT) devices, and more particularly, (pre)configuration for IoT device setup.

BACKGROUND

In order to set up an IoT device, a user is often required to manually provide information to the IoT device. Additionally, in order to set up more than one IoT device, a user is generally required to manually set up each IoT device on an individual basis. Furthermore, in order to set up an IoT device for more than one network, a user is generally required to manually set up each IoT device on each network. Accordingly, it can be desirable to provide systems and methods for IoT device setup with greater automation capabilities.

SUMMARY

In some aspects, a method, computer program product and system are provided. In an implementation, a system for IoT device setup is provided. The system can include (or otherwise utilize) at least one processor and/or memory, which can be configured to perform operations including receiving, by an intermediary device (e.g., smartphone) and from a server (e.g., cloud computing system), a configuration profile for setup of an IoT device. The configuration profile can include an identifier (e.g., SSID) of a first wireless network (e.g., Wi-Fi network). The operations can further comprise establishing, by the intermediary device, a connection to a second wireless network provided by the IoT device. Thereafter, the operations can further comprise providing, by the intermediary device and over the second wireless network, the configuration profile to the IoT device, wherein providing the configuration profile to the IoT device causes the Internet of Things device to establish a connection to the first wireless network.

In some variations, the configuration profile is generated at the server, in response to receiving, from the intermediary device or another device, data indicative of at least the identifier of the first wireless network.

In some variations, the intermediary device comprises a user equipment, the first wireless network comprises a Wi-Fi network provided by a Wi-Fi access point, and/or the second wireless network comprises another Wi-Fi network provided by the Internet of Things device.

In some variations, establishing the connection to the first wireless network can be automatic and/or comprise terminating, at the Internet of Things device and in response to receiving the configuration profile, the second wireless network and/or transmitting, by the Internet of Things device and to an access point of the first wireless network, a request to join the first wireless network.

In some variations, the operations further comprise providing, by the intermediary device and to the server, a request for the configuration profile, wherein the configuration profile is received in response to the request. In some implementations, the request is provided in response to detecting, at the intermediary device, a selection of a displayed indication of the configuration profile.

In some variations, the operations further comprise providing, by the Internet of Things device and to the server via the first wireless network, an indication of successful establishment of the connection to the first wireless network. In some related variations, the operations further comprise receiving, at the Internet of Things device and from the server in response to the indication, one or more additional configuration profiles for one or more additional wireless networks, wherein receiving the one or more additional configuration profiles enables the Internet of Things device to establish (e.g., automatically) a connection to any of the one or more additional wireless networks.

In some variations, the operations further comprise receiving, at the intermediary device and from the Internet of Things device, communication settings and/or capabilities for the Internet of Things device. In some related variations, the operations further comprise determining, at the intermediary device, that the second wireless network is unavailable and/or transmitting, by the intermediary device and to the server in response to detecting that the second wireless network is unavailable, the communication settings and/or capabilities for the Internet of Things device.

In some variations, the operations further comprise receiving, at the Internet of Things device, one or more configuration profiles for setup of a plurality of Internet of Things devices, and/or establishing, by the Internet of Things device, a connection to a third wireless network provided by another Internet of Things device of the plurality of Internet of Things devices. In some related variations, the operations further comprise providing, by the Internet of Things device and over the third wireless network, the one or more configuration profiles to the other Internet of Things device, wherein providing the one or more configuration profiles to the other Internet of Things device causes the other Internet of Things device to establish (e.g., automatically) a connection to the first wireless network or another wireless network indicated by the one or more configuration profiles.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 7 depicts an example of a method for configuration for IoT device setup, in accordance with some example implementations;

FIG. 8 depicts another example of a method for configuration for IoT device setup, in accordance with some example implementations;

FIG. 13 depicts a user interface for configuration setup, in accordance with some example implementations;

When practical, similar reference numbers denote similar structures, features, or elements.

DETAILED DESCRIPTION

As noted above, it can be desirable to provide systems for easier and/or more efficient IoT device setup. Current implementations often require a user to manually type configuration information (e.g., network SSID and password pairs) into a smartphone. Such implementations can be an annoyance to users due to small screens, small keyboards, long identifiers, long and/or complicated passwords, the requirement to set up each IoT device individually, and/or the like. In order to provide for easier and/or more efficient IoT device setup, the systems and methods described herein can provide for automated (at least in part) IoT device setup.

As used herein, automated and/or automatically can refer to one or more actions (e.g., execution of computer-implemented instructions) that do not require action and/or intervention by a user. For example, in some aspects, a user may select an item displayed on a user interface, which may cause information to be provided to an IoT device. In response to receiving the information, the IoT device may set itself up for communication over one or more wireless networks. In this regard, IoT device setting itself up may be regarded as automatic. The automation described herein can reduce smartphone interaction to a simple tap and/or selection, without a need for manual entry of text.

Additionally or alternatively, providing and/or storing IoT setup information ahead of time (e.g., in the form of a configuration profile) can simplify setup. For example, the IoT setup information can be provided and/or stored (for subsequent, on-demand access) within an office environment, on a larger screen, with a keyboard, with a mouse, and/or the like. Such implementations can reduce the time and/or effort required at the set-up location (e.g., within range of the IoT device and/or the wireless network for which the IoT device is being set up). In some aspects, much of the configuration information required to set up a device can be the same information required to setup other devices. Accordingly, only entering the configuration information once can reduce the time and/or effort required to set up multiple devices.

Figure 1:
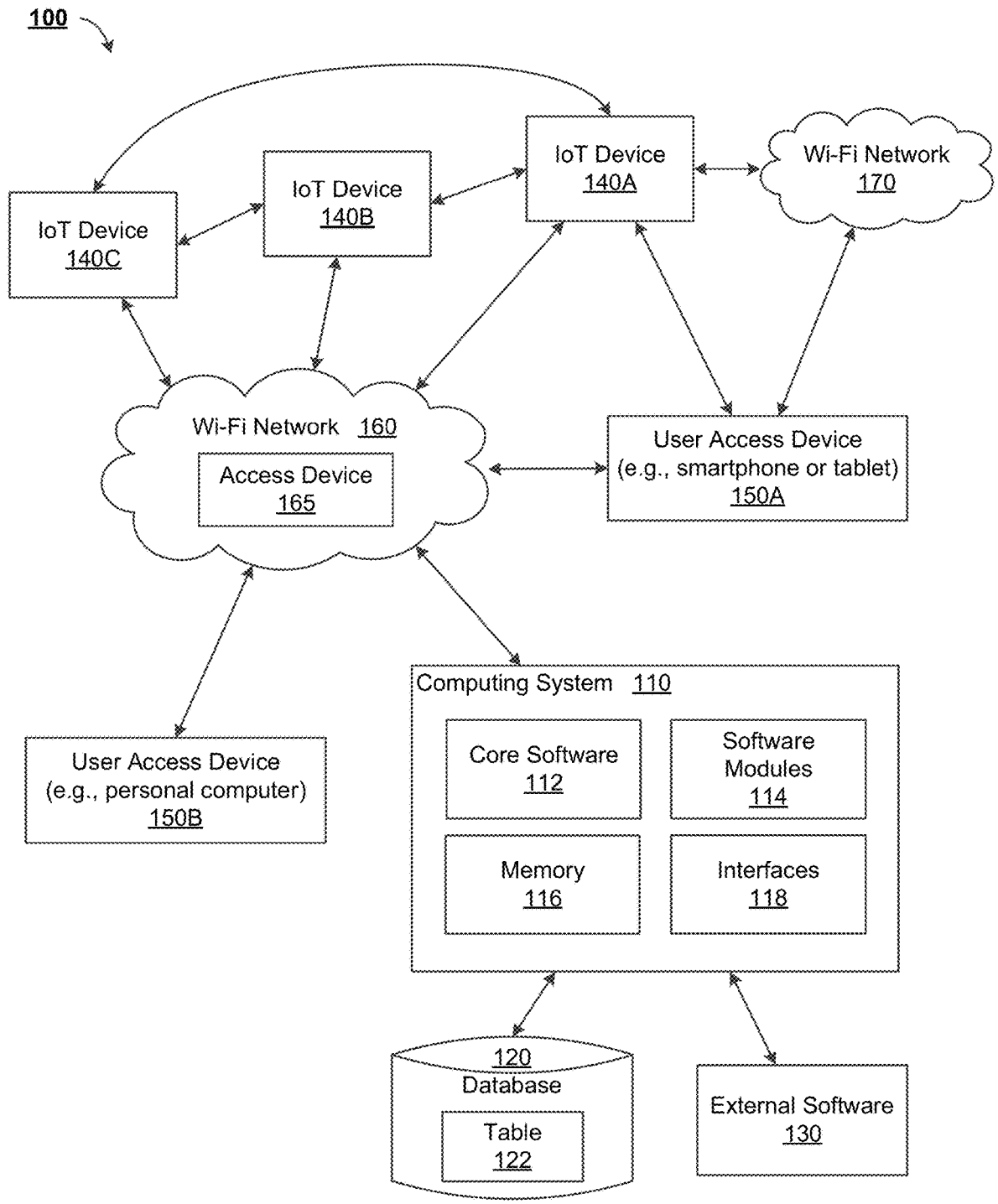
FIG. 1 depicts a block diagram of an IoT system, in accordance with some example implementations.

FIG. 1 illustrates a functional block diagram of a system 100 in which features consistent with the described subject matter may be implemented. As illustrated, the system 100 can include a computing system 110, one or more IoT devices 140A-C (referred to herein individually as "IoT device 140" and collectively as "IoT devices 140"), and/or one or more user access devices 150A-B (referred to herein individually as "user access device 150" and collectively as "user access device 150"). In various implementations, the computing system 110, one or more of the IoT devices 140, one or more of the user access devices 150, and/or other apparatuses can communicate among each other.

Communication among the devices in the system 100 can be through the use of direct communications, such as through the use of a wireless connection like Bluetooth, Bluetooth low energy (BLE), near-field communication (NFC), long range low power (LoRa), LoRaWAN, Thread, ZigBee, Z-Wave, Transport Layer Security (TLS), Secure Sockets Layer (SSL), radio-frequency identification (RFID), Wi-Fi, Wi-Fi direct, light-fidelity (Li-Fi), HaLow, some combination thereof, and/or the like. Additionally or alternatively, communication among the devices in the system 100 can be through the use of a hard-wired connection such as universal serial bus (USB) and/or the like. Communication can additionally or alternatively occur through indirect communications, such as over one or more networks which can include a local area network, a wide area network, a wireless network, the Internet, some combination thereof, and/or the like. In some aspects, the computing system 110 can utilize one or more interfaces 118 for communication. In some implementations, the computing system 110 may be regarded as a server, such as a cloud server.

As illustrated, network communications can be performed through a first Wi-Fi network 160, which can include or otherwise utilize at least one network access device 165. In some aspects, the network access device 165 can include a base station, a Node B, an evolved Node B (eNB), an access nodes (ANs), a hotspot, and/or the like. Similarly, communication over a second Wi-Fi network 170 can utilize an IoT device 140, which can provide the Wi-Fi network 170 for access by a user access device 150 or another IoT device 140, for example.

Although Wi-Fi networks 160 and 170 are illustrated and described, other networks or communication protocols are possible, such as those mentioned herein. For example, in some implementations, cellular, LoRa, and/or LoRaWAN networks and/or protocols can be utilized. In the case of LoRaWAN, an IoT device 140 could have a Wi-Fi interface that is used for initial setup (e.g., using network 170), and after the setup the IoT device 140 can communicate over a LoRaWAN network (e.g., similar to network 160). In some aspects, LoRaWAN devices can operate on a single coin battery and still achieve long (e.g., 20 km) range, providing advantages over Wi-Fi devices.

Wired or wireless communication among the computing system 110, IoT devices 140, and/or user access devices 150 can occur according to various protocols and/or access technologies (e.g., Global System for Mobile Communication (GSM), Universal Mobile Telecommunications System (UMTS), technologies developed by IEEE such as Wi-Fi and/or Bluetooth, technologies developed by the Third Generation Partnership Project (3GPP) or 3GPP2 such as Long Term Evolution (LTE), 4G, 5G, CDMA2000, and/or the like).

In some aspects, any of the IoT devices 140 and/or the user access devices 150 can include personal computers, desktop computers, laptops, workstations, cell phones, digital media devices, smart phones, smart watches, PDAs (personal digital assistants), tablets, hardware/software servers, sensors, sensor devices, terminals, access terminals (ATs), mobile stations, user equipment (UE), subscriber units, and/or the like.

In some aspects, one or more of the IoT devices 140 can include a device configured to operate and/or communicate according to low-power techniques. For example, one or more of the IoT devices 140 can include a device configured to utilize less battery power, less processing power, and/or sleep states. For example, to consume less processing resources and/or power, an IoT device 140 may have a lower capability (e.g., lower speed) when compared to high-end smartphone. In some aspects, an IoT device 140 may be configured as a sensor which performs measurements, monitors a local environment, forwards data to a cloud server, and/or the like.

In some implementations, at least a portion of the IoT devices 140 can be autonomous or semi-autonomous. For example, the IoT devices 140 can store/provide configuration information for themselves and/or for other IoT devices 140. Thus, a user may be able to access one IoT device 140 and change the configuration of and/or provide configuration information to other IoT devices 140. In some aspects, this configuration information can include network information, such as an identifier and/or password (or other credentials) for one or more Wi-Fi networks, such as Wi-Fi network 160.

As illustrated, the computing system 110 can include core software 112 and/or one or more software modules 114. The core software 112 can provide one or more features of a high-level programming software system. The software modules 114 can provide more specialized functionality. For example, the core software 112 and/or software modules 114 can include IoT management and/or database management features. In some aspects, the core software 112 or other similar software/hardware can be capable of accessing a database layer, such as the database 120 including at least one table 122 having at least one column/row. The database table 122 can store any kind of data, potentially including but not limited to operational and/or configuration data retrieved from/for an IoT device 140. In some implementations, the database table 122 can include various forms of data, such as user data, metadata, configuration data, and/or the like. The database 120 may be physically stored in a hardware server or across a plurality of hardware servers.

In some aspects, one or more of the software modules 114 can be configured to utilize data stored in the memory 116, data stored in the database 120, and/or data otherwise accessible to the computing system 110. As further illustrated, the computing system 110 can be capable of utilizing external software 130. In some aspects, the external software 130 can provide additional functionalities or services which may not be available at the computing system 110. For example, the external software 130 may include cloud services. In some aspects, the computing system 110 can be regarded as providing cloud-based services. In some aspects, the computing system 110 can aggregate or otherwise provide a gateway via which users can access functionality provided the external software 130. In some implementations, the database 120 and/or the external software 130 can be located across one or more servers, and/or communication among the computing system 110, the database 120, and/or the external software 130 can occur over a network, such as one or more of the Wi-Fi networks 160, 170.

In some aspects, the core software 112 can be configured to load information from the database 120 to memory 116 (e.g., main memory) in response to instructions from a user or computer system. For example, instructions can be received through one or more IoT devices 140, one or more user access devices 150, external software 130, and/or the like. Although the database 120 is illustrated as being separate and, at times, described as being separate from the computing system 110, in various implementations, at least a portion of the database 120 can be located within the computing system.

Figure 2:
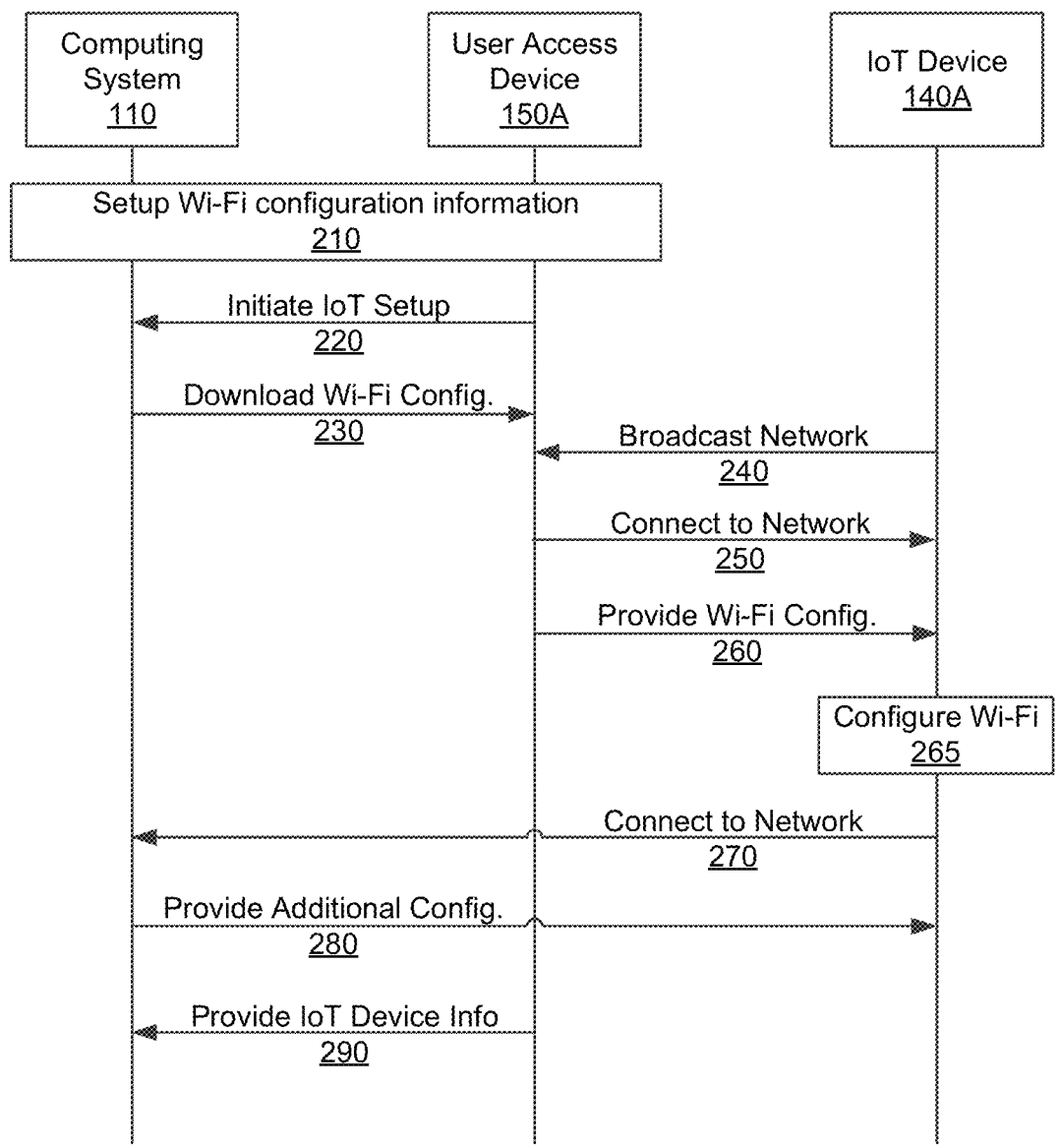
FIG. 2 depicts a message exchange for the setup of an IoT device, in accordance with some example implementations.

In order to provide communications between the computing system 110 and an IoT device 140, the IoT device 140 may need to be set up for communication over the network 160. FIG. 2 depicts a message exchange 200 for the setup of an IoT device 140A, in accordance with some example implementations. In some aspects, at least a portion of the message exchange 200 can provide for at least a portion of a configuration protocol. Although "configuration" protocols are described, at least a portion of these protocols can be regarded as "preconfiguration" protocols, as configuration information can be generated, stored, transmitted, received, and/or utilized prior to the actual configuration of an IoT device 140 (e.g., prior to a user turning an IoT device 140 on, prior to a user initiating communication with an IoT device 140, prior to initiation of a setup protocol for an IoT device 140, prior to completion of a setup protocol for an IoT device 140, and/or the like). As illustrated, the message exchange 200 can be among the computing system 110, the user access device 150A, and the IoT device 140A of FIG. 1. However, additional and/or alternative devices/entities may be involved in the message exchange 200. For example, more than one user access device 150 can be part of the messages exchange 200 and/or the actions/procedures of the illustrated user access device 150A can be split between/among more than one user access device 150.

As illustrated, the message exchange 200 can start at operational block 210, which can include the setup of Wi-Fi (and/or other network) configuration information. In some aspects, a configuration profile including the configuration information (and/or some indication(s) thereof) can be generated for one or more IoT device 140. For example, configuration information can be entered by a user, at least partially automated, through a website, through an application, via a personal computer, via a smartphone, and/or the like. In some implementations, the configuration information can include one or more of access information required by the IoT device 140 to access a network (e.g., identifier, security credentials such as a password, login information, etc.), an identifier for the IoT device 140, a name for the configuration profile, user preferences, default settings, network prioritization information, and/or the like. The configuration information may include access information for more than one network. For example, if a user would like to set up an IoT device 140 for communication over three networks, then the configuration information can include access information for all three networks (e.g., identifiers, passwords, and/or the like for each). In some implementations, the identifier of a network can include a Service Set Identifier (SSID). In the event the network is not secured by a password, the password may be omitted. Although a password is described, other security information can be part of the configuration information, such as keys for encryption and/or authentication. In some aspects, including the configuration information (or at least a common portion thereof) in more than one configuration profile can be beneficial, as the configuration may only be required to be entered once.

As illustrated, operational block 210 can involve the computing system 110 and a user access device 150A, such as a personal computer, smartphone, and/or the like. In some implementations, a user may enter information into the user access device 150A, which in turn provides information to the computing system 110. The information provided by the user and/or to the computing system 110 can include the configuration information itself, a subset of the configuration information, one or more indications of the configuration information, information which may be used to identify/generate configuration information, and/or the like. In some implementations, at least a portion of the configuration information can be automatically (e.g., without direct user input) generated. For example, in some aspects, a user can provide some configuration information and additional configuration information can be generated based on the user input, based on previously stored information, and/or the like.

In some implementations, the user access device 150A may provide a user interface for allowing the user to enter the configuration information. For example, the user access device 150A can provide a web-based (e.g., Java, HTML, and/or the like) user interface for the user to enter information. In some aspects, the user interface can be similar to one or more of the user interfaces illustrated in FIGS. 9-20. In some aspects, the web-based user interface may be provided by and/or controlled by the computing system 110. In some aspects, a user may be required to log in to the web-based user interface (or some other system provided by the computing system 110) in order to provide and/or access configuration information. Additionally or alternatively, in some implementations, a software application (e.g., phone app or other executable application) may be used to provide the information to the computing system 110.

Figure 10:
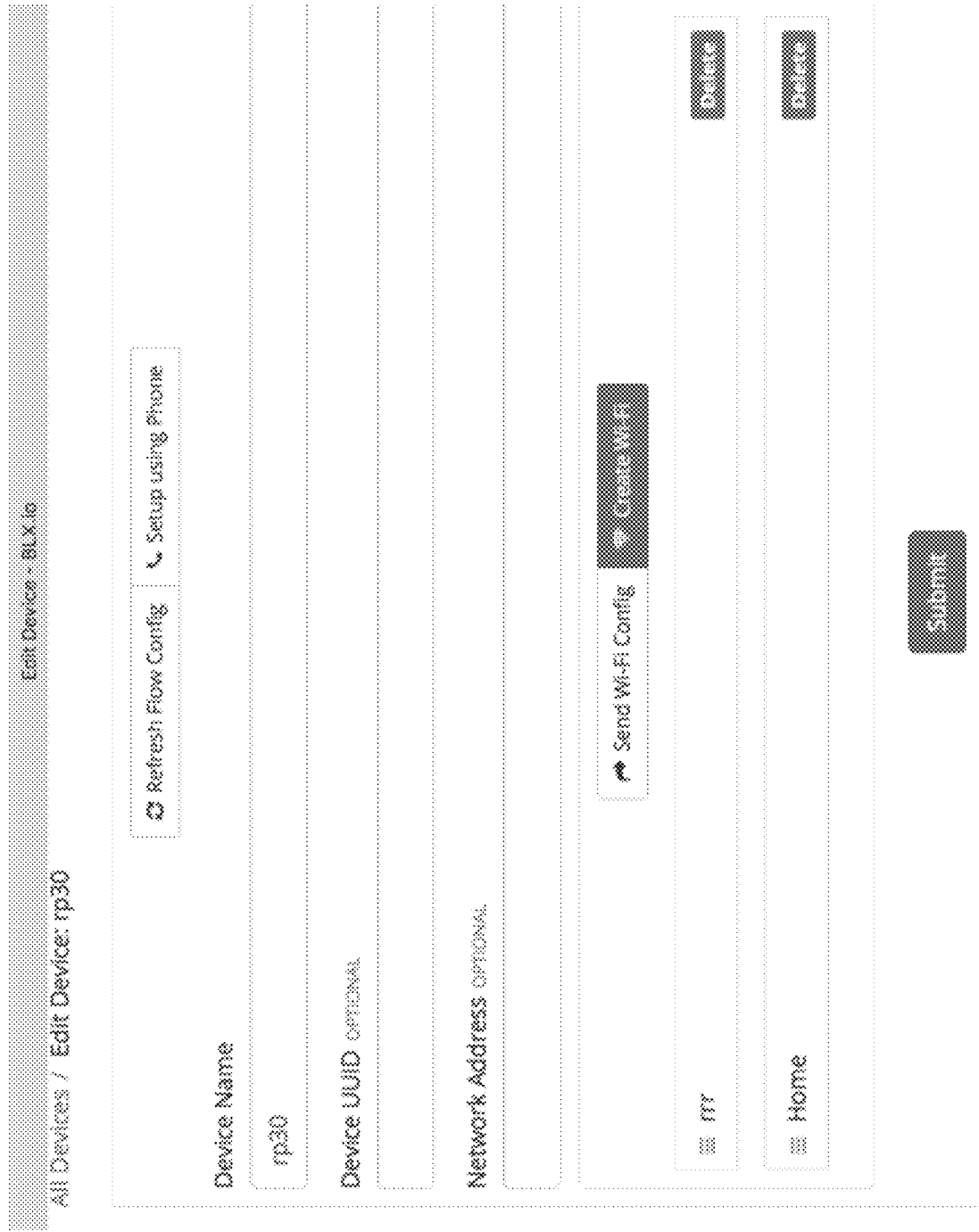
FIG. 10 depicts a user interface for providing configuration information, in accordance with some example implementations.
Figure 11:
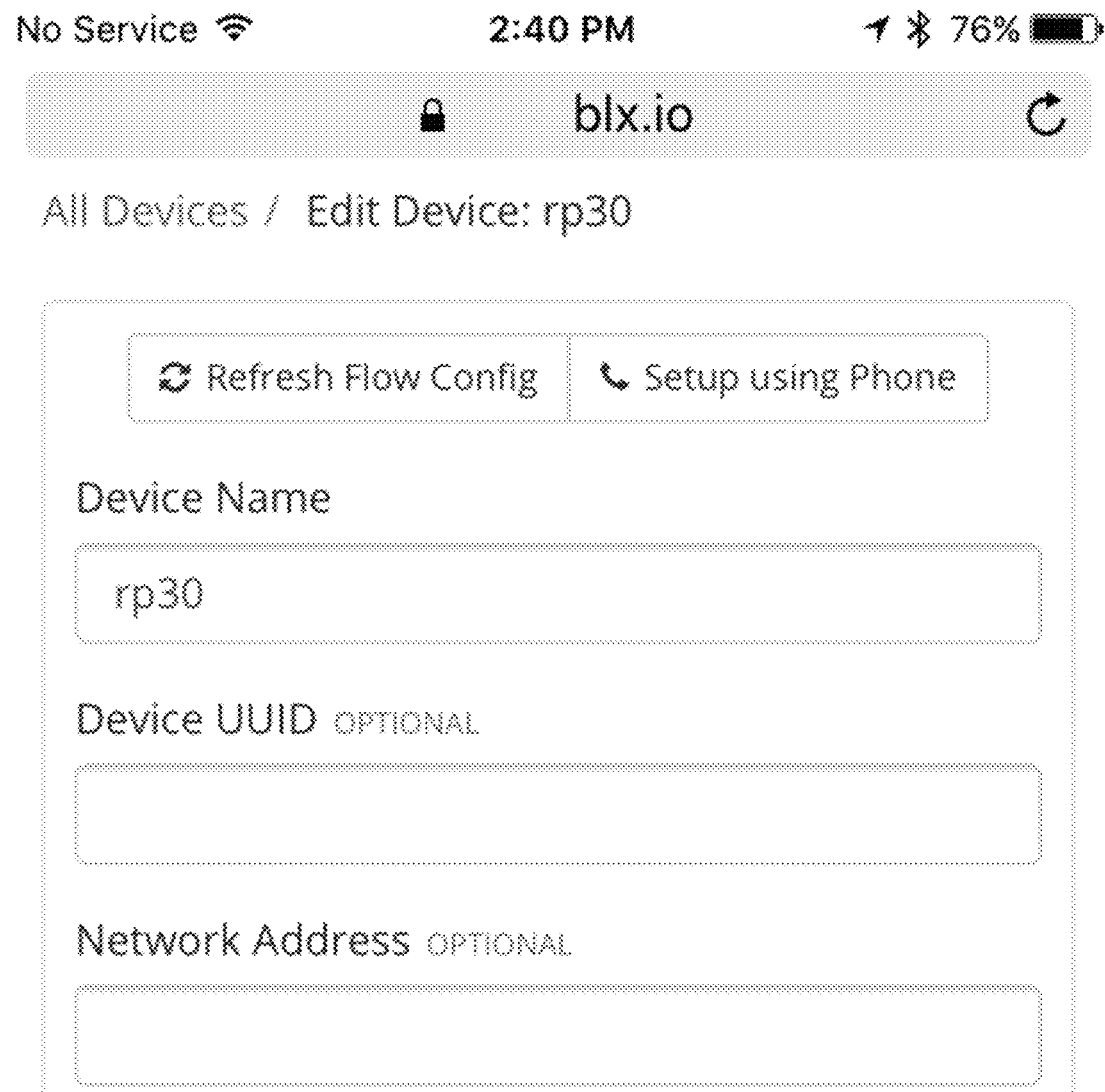
FIG. 11 depicts another user interface for providing configuration information, in accordance with some example implementations.

In some aspects, configuration information can be provided by a user to the computing system 110, for example, through a user interface similar to the interface(s) illustrated in FIG. 10 and/or FIG. 11. FIG. 10 depicts a user interface for providing configuration information, in accordance with some example implementations. As illustrated, two networks (illustrated as "rrr" and "Home") can be added to a configuration profile for an IoT device 140 (illustrated as "rp30"). Networks can be added to the configuration profile through the use of the "Create Wi-Fi" button. Once networks (e.g., on a per-user basis) are added, they can be stored and later accessed by a simple selection mechanism to be added to the configuration profile for an IoT device 140. FIG. 11 depicts another user interface for providing configuration information, in accordance with some example implementations. In some aspects, the user interface illustrated in FIG. 11 can be a user interface for a smart phone, whereas the user interface illustrated in FIG. 10 can be a user interface for a desktop computer.

The computing system 110 can store multiple configuration profiles and/or access information for multiple networks. In some aspects, the user interface provided by the computing system 110 can allow for a user to create a configuration profile by manually inputting information for each network and/or allowing the user to select from one or more stored networks. In some aspects, configuration profiles can be stored with a pointer to, an identifier for, and/or some other indication of each network a user wishes to enable for the IoT device 140A. In related aspects, a user can be allowed to update a data structure for a particular network (e.g., change a password and/or identifier of the network), and the computing system 110 can automatically (e.g., in response to a user action without additional user action) provide updated configuration profiles for IoT devices 140 associated with the updated network. Additionally or alternatively, a user may be provided with an interface for updating configuration profiles, which can be automatically sent to one or more (e.g., all) affected IoT devices 140. Such updating can include the addition and/or removal of one or more networks.

After the configuration information is set up, at operational block 220, the user access device 150A, for example, may initiate the setup of IoT device 140A. In some implementations, the user access device 150A may initiate setup of the IoT device 140A by requesting, from the computing system 110, configuration information for the IoT device 140A. The user can request the configuration information via a selection of a configuration profile for the IoT device 140A, which can occur through the web-based user interface of the user access device 150A. In some aspects, the IoT device 140A may be unaware of the existence of the configuration profile and/or the configuration profile can exist without any identification information for the IoT device 140A. For example, a configuration profile can be stored with a name for the profile (and thereby, a name for the IoT device 140A), but the configuration profile might not have an identifier for the IoT device 140A, such as a medium access control (MAC) address of the IoT device 140A. However, as part of message exchange 200, the configuration profile for the IoT device 140A can be updated to include additional information for the IoT device 140A.

Figure 12:
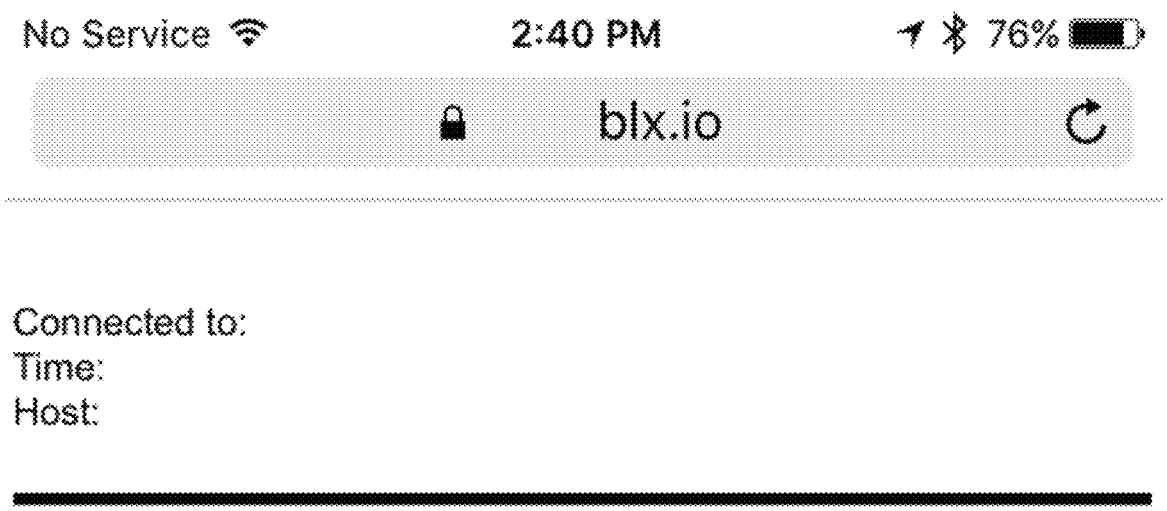
FIG. 12 depicts a user interface for receiving configuration information, in accordance with some example implementations.

In some aspects, initiation of the IoT setup can occur through a user interface similar to the interface(s) illustrated in FIG. 10 and/or FIG. 11, such as through a user selecting the "Setup using Phone" button illustrated in FIG. 11. Thereafter, a user interface similar to FIG. 12 can be provided to the user. FIG. 12 depicts a user interface for receiving configuration information, in accordance with some example implementations. The user interface of FIG. 12 illustrates the status of the user access device 150A fetching a configuration profile from the computing system 110.

In response to the user access device 150A initiating setup, at operational block 230, the computing system 110 can provide the configuration information to the user access device 150A. In some aspects, the user access device 150A can receive (e.g., download, retrieve, and/or the like) the configuration information from the computing system 110 and/or store the configuration information locally. The configuration information received can include a stored configuration profile or some portion thereof. In some implementations, the configuration information is fetched via a call, such as an asynchronous JavaScript (AJAX) call, and/or stored at the user access device 150A.

In some aspects, upon receiving the configuration profile from the computing system 110, the user can be provided with and interface similar to the user interface illustrated in FIG. 13. FIG. 13 depicts a user interface for configuration setup, in accordance with some example implementations. In some aspects, the user interface of FIG. 13 can indicate to a user that the necessary information (e.g., configuration profile) have been received and/or prompt the user to connect to an IoT device 140A (e.g., via a network 170 provided by the IoT device 140A).

In some implementations, the configuration information can be stored locally (e.g., as data in memory) at the user access device 150A. Additionally or alternatively, the configuration information can be stored as a local variable in a context for a web-based user interface. In some aspects, storing the configuration information in the context can be advantageous, as the requirement for a dedicated/specialized application to perform IoT configuration can be eliminated. For example, a smartphone web browser can be used as a bucket to carry configuration information from one connection (e.g., Wi-Fi network 160) over to another connection (e.g., Wi-Fi 170), and ultimately to the IoT device 140. Such implementations can be provided, even though the user access device 150A is switched from one network connection to another, where the configuration information is persisted inside the browser context. In some aspects, a web browser used for these purposes can include a web browser that is installed on the user access device 150A by default (e.g., factory settings) and/or a web browser installed by a user.

If the configuration information is not properly received, the call may be repeated automatically until the required information is successfully loaded. In some aspects, the user may be presented with the status (e.g., success or failure) of this information reception phase, which can be provided via the web-based user interface.

Once the configuration information is successfully loaded to the user access device 150A, the user access device 150A may establish (or initiate establishment of) communication with the IoT device 140A. For example, as illustrated, at operational block 240, the IoT device 140A can provide a Wi-Fi network 170, such as a Wi-Fi hotspot, for access by the user access device 150A. In some aspects, the IoT device 140 can emit (e.g., broadcast, unicast, etc.) an identifier, such as an SSID, for the Wi-Fi network 170, which can be received, selected, and/or recognized by the user equipment device 150A. In some implementations, the IoT device 140A can initiate its own wireless network on power up (e.g., if the IoT device 140A has not been configured for communication over a network within range), periodically, via user-initiated action (e.g., utilizing a user interface on or otherwise in connection with the IoT device 140A), and/or the like, such as under conditions described herein.

Since there may be many Wi-Fi networks within range of the user access device 150A (including many IoT devices 140 awaiting configuration), a user may need to be able to identify which SSID comes from the IoT device 140A to be configured. Accordingly, in some implementations, the SSIDs of one or more of the IoT devices 140 can be provided in the form AAAxxxx, where the AAA portion includes any number and/or type of characters (e.g., letter, number, special character, etc.) and the xxxx portion includes at least a portion of the MAC address of the IoT device 140. In some aspects, the SSID can be printed on an exterior and/or case of the IoT device 140 so that the information is easy to locate and/or recognize during setup. Additionally or alternatively, the SSID can be provided through a display or other user interface of the IoT device 140. Providing an unambiguous SSID among active networks at the time of configuration can be advantageous. Additionally or alternatively, at least a portion of the IoT devices 140 may be configured to coordinate such that a small number (e.g., only one) of the IoT devices 140 are in configuration mode at a time.

In some aspects, operational block 240 can be implemented by the IoT device 140A, such as when no known networks are present. For example, if the IoT device 140A was previously configured for network communications (e.g., via Wi-Fi), then the IoT device 140A may first attempt to connect to each of the known networks (e.g., until the IoT device 140A successfully establishes contact with the Wi-Fi network 160, 170, the access device 165, the computing system 110, and/or the like). In some aspects, the list of known networks can be prioritized for connection attempts. If the IoT device 140A cannot connect to any of the known networks, then the IoT device 140A can be configured to provide the Wi-Fi network 170 for access by the user access device 150A. However, if the IoT device 140A has not been configured for network communications (e.g., out-of-the-box or factory reset), then the IoT device 140A may provide the Wi-Fi network 170 without attempting to connect to another device. In some implementations, the web-based user interface may be provided by the computing system 110 and/or may provide instructions to the user for powering up the IoT device 140A and/or connecting to the Wi-Fi network 170 provided by the IoT device 140A.

At operational block 250, the user access device 150A can connect to the Wi-Fi network 170 provided by the IoT device 140A. For example, in some implementations, the user can navigate to a user interface (e.g., a settings and/or other application inherent to a smartphone), provided by the user access device 150A, which allows for the selection of the Wi-Fi network 170. In some aspects, the web-based user interface can remain active during these operations (e.g., running in the background). In some implementations, the Wi-Fi network 170 can be password protected to further secure the connection. After the user selects the Wi-Fi network 170, the user may switch back to the web-based user interface. During the switch, the configuration information can be retained as a local variable of the web page, as described herein.

Figure 14:
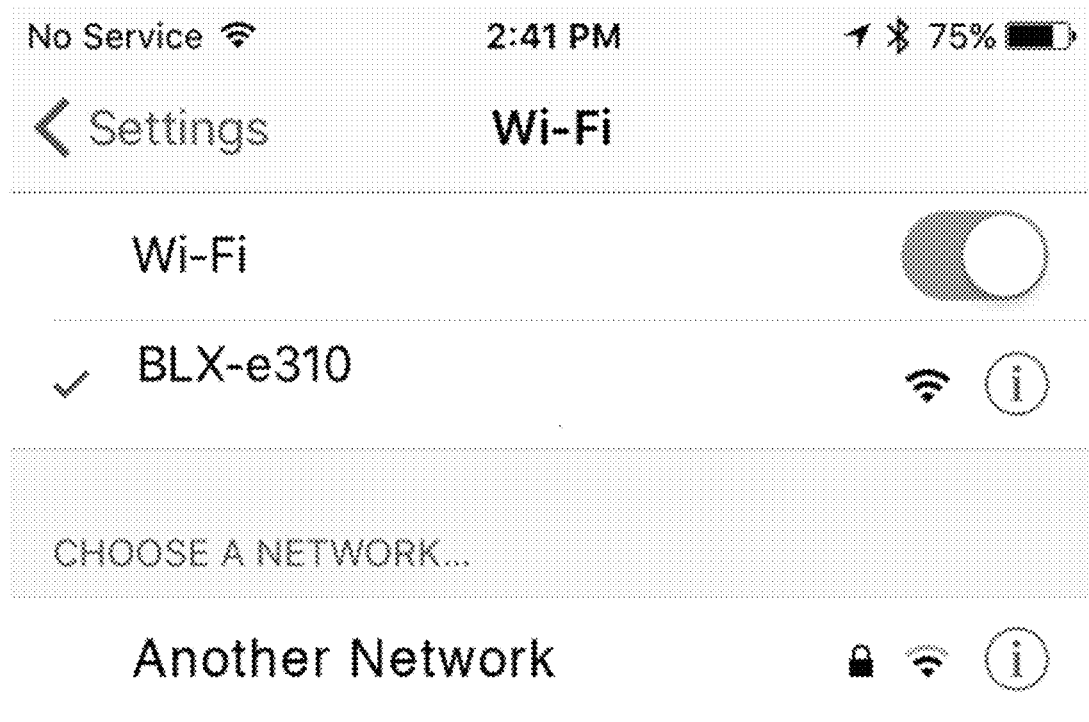
FIG. 14 depicts a user interface for selecting a wireless network, in accordance with some example implementations.

In some aspects, the user can make a selection to connect to the network 170 via an interface similar to the user interface illustrated in FIG. 14. FIG. 14 depicts a user interface for selecting a wireless network, in accordance with some example implementations. In some aspects, the user interface of FIG. 14 can be part of a settings application provided by a user access device 150. As illustrated, "BLX-e310" can be an indication of the network 170 provided by the IoT device 140A.

In some implementations, after the user access device 150A identifies the Wi-Fi network 170 provided by the IoT device 140A, the user access device 150A may automatically attempt to connect to the Wi-Fi network 170. For example, in some implementations, the user can navigate back to the web-based user interface (e.g., web browser), which can attempt (or reattempt e.g., via JavaScript or AJAX code and/or calls) to connect to the Wi-Fi network 170 and/or a web server running on the IoT device 140A. In some aspects, connecting to the Wi-Fi network 170 can be a perquisite, but distinct from connecting to the user access device 150A, in preparation of an information exchange. Connecting to the Wi-Fi network 170 can be handled by a settings application running on the user access device 150A, and/or can include the selection of the relevant SSID, provision of a password, and/or the like. In some implementations, after the user access device 150A accesses the Wi-Fi network 170 and/or after a user switches back to a browser application running on the user access device 150A, the content of the web-page (e.g., previously loaded from the computing system 110) can perform the AJAX calls to connect to a web server running on the IoT device 140A.

In some aspects, the user access device 150A may receive an Internet Protocol (IP) address for the IoT device 140A. However, even if the web-based user interface does not have access to the particular IP address of the IoT device 140A, the web-based user interface may attempt to connect to a default route for the Wi-Fi network 170 and/or or to any name which can be resolved by a domain name server (DNS) for the IoT device 140A. In some implementations, special handling may be required to accommodate Hyper Text Transfer Protocol Secure (HTTPS) connections and/or to provide valid certificates. In some aspects, since the user access device 150A is connected to the network 170 and/or is likely the only device on the network 170 (other than the IoT device 140A), typical network services like dynamic host configuration protocol (DHCP) and/or DNS may be provided by the IoT device 140A. Therefore, a DNS server may be running on the IoT device 140A to provide the name-to-IP address mapping, which can allow the web application running on the user access device 150A to connect to the web server on the IoT device 140A.

Once the user access device 150A is connected to the Wi-Fi network 170 provided by the IoT device 140A, the user access device 150A (e.g., via the web-based user interface) may automatically provide the configuration information to the IoT device 140A as part of operational block 260. For example, in some implementations, code provided for the web-based user interface can interact with software on the IoT device 140A, allowing the user access device 150A to find and/or connect to the IoT device 140A, and then transmit the configuration information to the IoT device 140A without user assistance (e.g., beyond a network selection in a phone settings application). Alternatively, in some implementations, the user access device 150A can provide a prompt requesting the user's confirmation before sending the configuration information.

Figure 15:
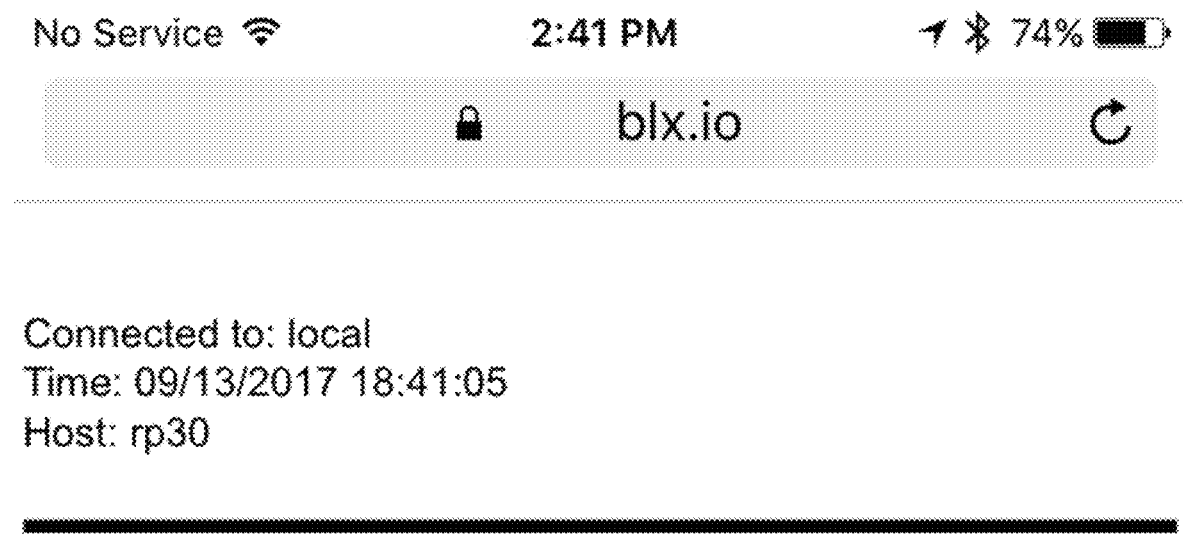
FIG. 15 depicts another user interface for providing configuration information, in accordance with some example implementations.
Figure 16:
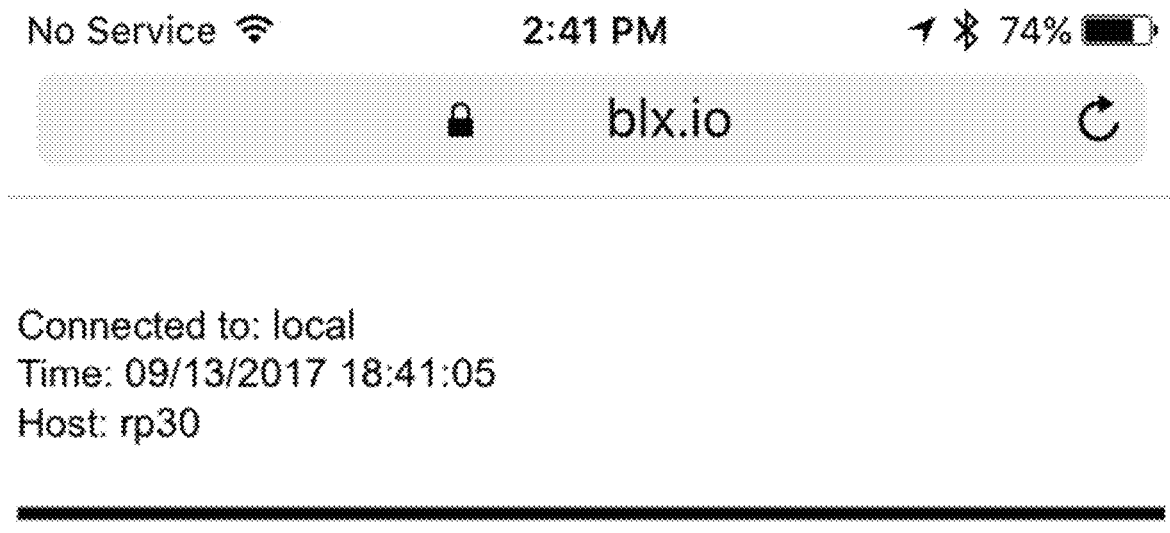
FIG. 16 depicts another user interface for providing configuration information, in accordance with some example implementations.
Figure 17:
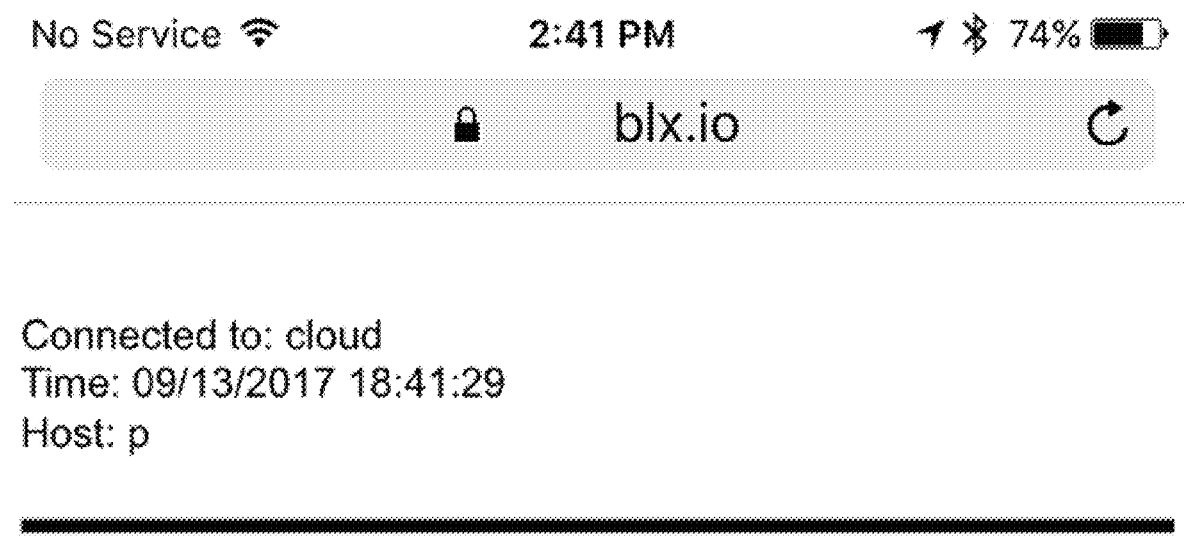
FIG. 17 depicts another user interface for providing configuration information, in accordance with some example implementations.

In some aspects, the user can initiate the provision of the configuration profile via an interface similar to the user interface illustrated in FIG. 15. FIG. 15 depicts another user interface for providing configuration information, in accordance with some example implementations. In some aspects, selection of the "Send config" button can initiate the provision of the configuration profile to the IoT device 140A. In some aspects, after a connection to the IoT device is detected, a user access device 150 can automatically (e.g., without user-selection of the "Send config" button or another button) initiate the provision of the configuration profile to the IoT device 140A. After initiation of the provision of the configuration profile, a user can be provided with information indicative of the status of the provisioning, such as through an interface similar to the user interface illustrated in FIG. 16. FIG. 16 depicts another user interface for providing configuration information, in accordance with some example implementations. Upon completion of the provision of the configuration profile, a user can be provided with information indicative of the completion of the provisioning, such as through an interface similar to the user interface illustrated in FIG. 17. FIG. 17 depicts another user interface for providing configuration information, in accordance with some example implementations. As illustrated, the user can be provided with an option to return to an interface for editing device information, such as the user interface(s) of FIG. 10 and/or FIG. 11.

After the IoT device 140A receives the configuration information and as part of operational block 265, the IoT device 140A can configure itself for communication, based on the configuration information. Thereafter, the IoT device 140A can attempt to connect to the network 160 as part of operational block 270. In some implementations, the IoT device 140A may periodically attempt to connect to the network and/or communicate with the computing system 110 based on the configuration information. For example, in some implementations, the access information provided to the IoT device 140A can include an identifier (e.g., SSID) and/or password for a network access device 165, such as a Wi-Fi access point or another type of wireless access point. In accordance with these implementations, the IoT device 140A can attempt to locate and/or connect to the network access device 165 in order to communicate, over the network 160, and/or with the computing system 110. In some implementations, the access information can additionally or alternatively include a nonce, which can be provided to the computing system 110 to enable the computing system 110 to identify the IoT device 140A being configured. As a result of operational blocks 265 and/or 270, the IoT device 140A can operate according to an initial configuration, and/or can connect to the computing system 110 to start operation and/or to obtain additional configuration information. Subsequent configuration of the IoT device 140A can be performed via the computing system 110 without going through the user access device 150A and/or operational blocks 210-260 again.

In some aspects, at least a portion of message exchange 200 can provide a valid initial configuration to a previously unconfigured and/or misconfigured device 140. In the event access information for more than one network is desired, each of the networks can be prioritized and/or only the configuration information for the highest priority network might be provided by the computing system 110 as part of operational block 230. In some implementations, the computing system 110 may only provide the configuration information for the highest priority network that is in range of the IoT device 140, and the configuration information for the remaining networks can be retrieved by the IoT device 140A when it connects back to the computing system 110 (e.g., for subsequent configuration). In some implementations, the computing system 110 may provide the configuration information for the networks that the IoT device 140A needs (e.g., specified beforehand, such as within a configuration profile). Additionally or alternatively, in some implementations, only a portion of the configuration information provided to the user access device 150A is sent to the IoT device 140A, based on some criteria and/or by a user selecting (e.g., via a display on the user access device 150A) a desired subset.

Additionally or alternatively, access information for multiple networks may be provided to the user access device 150A as part of operational block 230, but only the access information for the highest priority network might be provided to the IoT device as part of operational block 260. Once the IoT device 140A is set up for communication on one network, access information for any remaining networks can be provided at operational block 280. For example, after initial configuration, the IoT device 140A may request access information for any additional networks that are part of a configuration profile for the IoT device 140A. Additionally or alternatively, the computing system 110 can detect that the IoT device 140A is connected and/or send the access information for any additional networks to the IoT device 140A. This access information can be for any of the networks that are part of the configuration profile for the IoT device 140A, which were not provided at operational block 260.

Prior to (or as part of) operational block 265, the IoT device 140A can rescind the Wi-Fi network 170. When the IoT device 140A rescinds the Wi-Fi network 170, the user access device 150A can lose the connection and/or revert to a previously configured network connection (e.g., cellular or Wi-Fi). Once the user access device 150A is connected to the network 160 again (which may not be the same network to which the user access device 150A was connected prior to Wi-Fi network 170), as part of operational block 290, the user access device 150A can connect to the computing system 110 and/or pass information about the IoT device 140A back to the computing system 110. For example, in order to establish a connection with the IoT device 140A and/or in the process of providing the configuration information to the IoT device 140A, the user access device 150A may receive information from/for the IoT device 140A. Public encryption keys for the IoT device 140A are an example. The unique ID of the IoT device 140A is another example, which can be sent back to the computing system 110 to identify the IoT device 140A to the computing system 110. Additionally or alternatively, a nonce can be another example. Any information (or some portion thereof) received by the user access device 150A from/for the IoT device 140A can be transmitted back to the computing system 110 after the configuration information is provided in operational block 260. In some implementations, the web-based user interface can be leveraged to provide this information to the computing system 110.

In some implementations, the user access device 150 (e.g., user access device 150B) used to setup the configuration information in operational block 210 can be different from the user access device 150 (e.g., user access device 150A) used to provide the configuration information to the IoT device 140A in operational block 260 (and/or implement any of operational blocks 220-250 and/or 290). In the event different user access devices 150 are utilized in this manner, then the access information and/or other sensitive data can be controlled, such that the user access device 150 (e.g., user access device 150A) communicating with the IoT device 140 does not have access to any or all configuration information for the IoT device 140A. Additionally or alternatively, the configuration information provided to the user access device 150A may be encrypted in a manner that is not completely decipherable by the user access device 150A, but is decipherable by the IoT device 140A.

In some aspects, the IoT device 140A can be configured to handle errors. For example, if the IoT device 140A is already configured and/or operational, but determines that it is unable to connect to the computing system 110, then the IoT device 140A may be configured to determine when to go back to providing its own Wi-Fi network 170 and/or seek reconfiguration (e.g., revert to setup mode). In the event the IoT device 140A is just temporarily out of range of one of its networks, doing nothing may be appropriate. However, if the IoT device 140A is relocated or the network access device 165 (or any other device) is no longer operational, then the IoT device 140A may need reconfiguration. In some aspects, the IoT device 140A can be configured to periodically provide the Wi-Fi network 170 and/or information for the Wi-Fi network 170 to check if new configuration is available, and/or continue to attempt connection to the Wi-Fi network 160. In some implementations, if the IoT device 140A has an additional Wi-Fi interface, then the IoT device 140A may be configured to continuously broadcast its network 170 on one interface and/or communicate over network 160 with another interface.

Although specific messages are illustrated as occurring in a particular order, other orderings are possible. For example, in some aspects, the IoT device 140A can advertise or otherwise provide its own network information (e.g., identity) at any time prior to the user access device 150A attempting to connect to the IoT device 140A.

Figure 3:
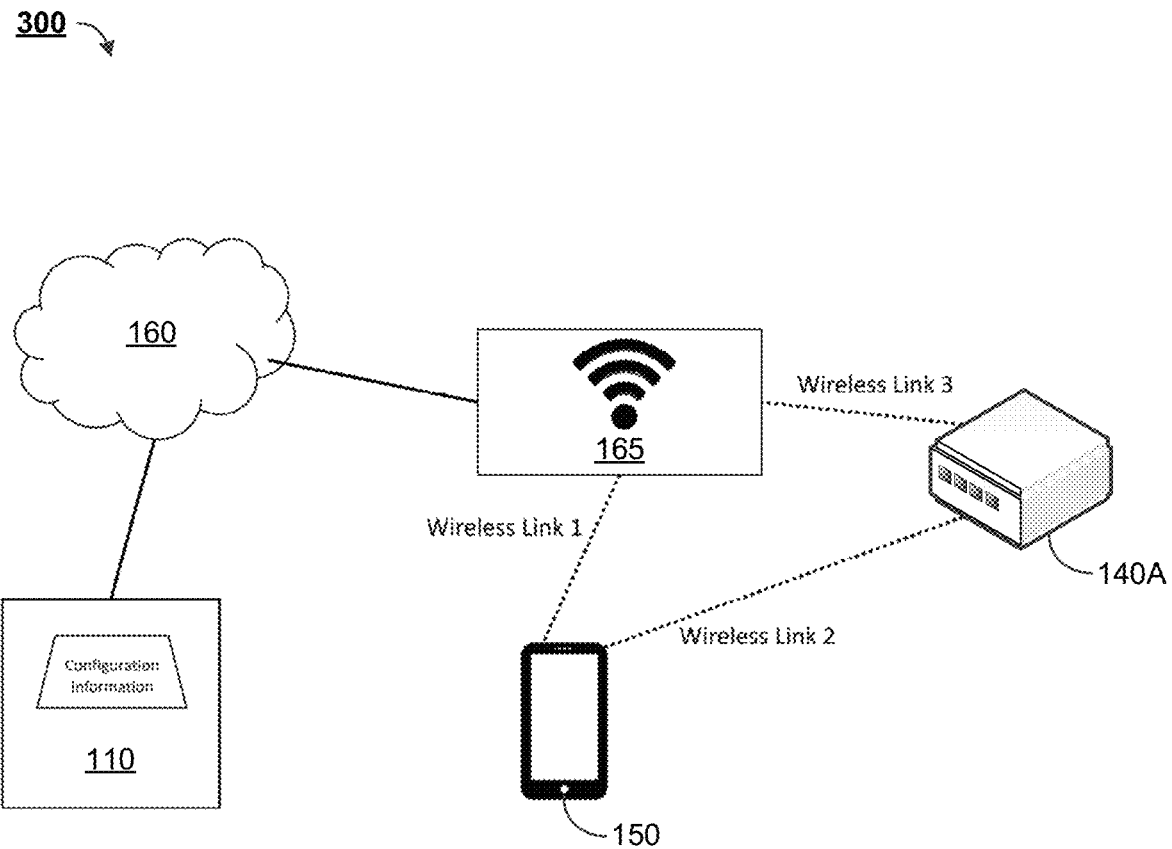
FIG. 3 depicts a system for setting up the IoT device of FIG. 2, in accordance with some example implementations.

The message exchange 200 of FIG. 2 can be implemented within the system 100 of FIG. 1 and/or within another system. For example, FIG. 3 depicts a system 300 for setting up the IoT device 140A of FIG. 2, in accordance with some example implementations. As illustrated, the user access device 150A may communicate with the computing system 110 via a first link (e.g., for operational blocks 210, 220, 230, and/or 290), the IoT device 140A may communicate with the user access device 150 via a second link (e.g., for operational blocks 240, 250, and/or 260), and/or the IoT device 140A may communicate with the computing system 110 via a third link (e.g., for operational blocks 270 and/or 280). The illustrated links can be wired and/or wireless.

In some aspects, the user access device 150A can communicate with the computing system 110 over a different path than the IoT device 140A, such as through another access point (e.g., router) other than the illustrated network access device 165. For example, a fully-configured IoT device 140 may not actually communicate over Wi-Fi during in normal (e.g., after configuration) operation. Instead, the IoT device 140 may use some other communications technology, such as Bluetooth, cellular, LoRaWAN, and/or the like. In some aspects, Wi-Fi hotspot capability for providing the Wi-Fi network 170 may be part of the IoT device 140 to assist in initial configuration, hard-reset reconfiguration, and/or the like. Although each of the user access device 150A and the IoT device 140A are illustrated and described as communicating with the same computing system 110, in some implementations, the user access device 150A and the IoT device 140A can communicate with separate computing systems 110.

For example, an isolated control system can include multiple of IoT devices 140 and a private computing system 110A. The user access device 150A may obtain the configuration information from a different computing system 110B and transmit the configuration information to IoT devices 140 which, in turn, connect to the private computing system 110A. Additionally or alternatively, the user access device 150A can provide configuration information for IoT devices 140 to communicate amongst themselves, and/or none (or only some) of the IoT devices 140 may ever communicate with the computing system 110. In order to reconfigure IoT devices 140 which are not connected to the computing system, from time to time and/or in response to some stimulus (e.g., switching a physical switch) the IoT devices 140 can provide their own network and/or listen for information from a user access device 150.

Figure 4:
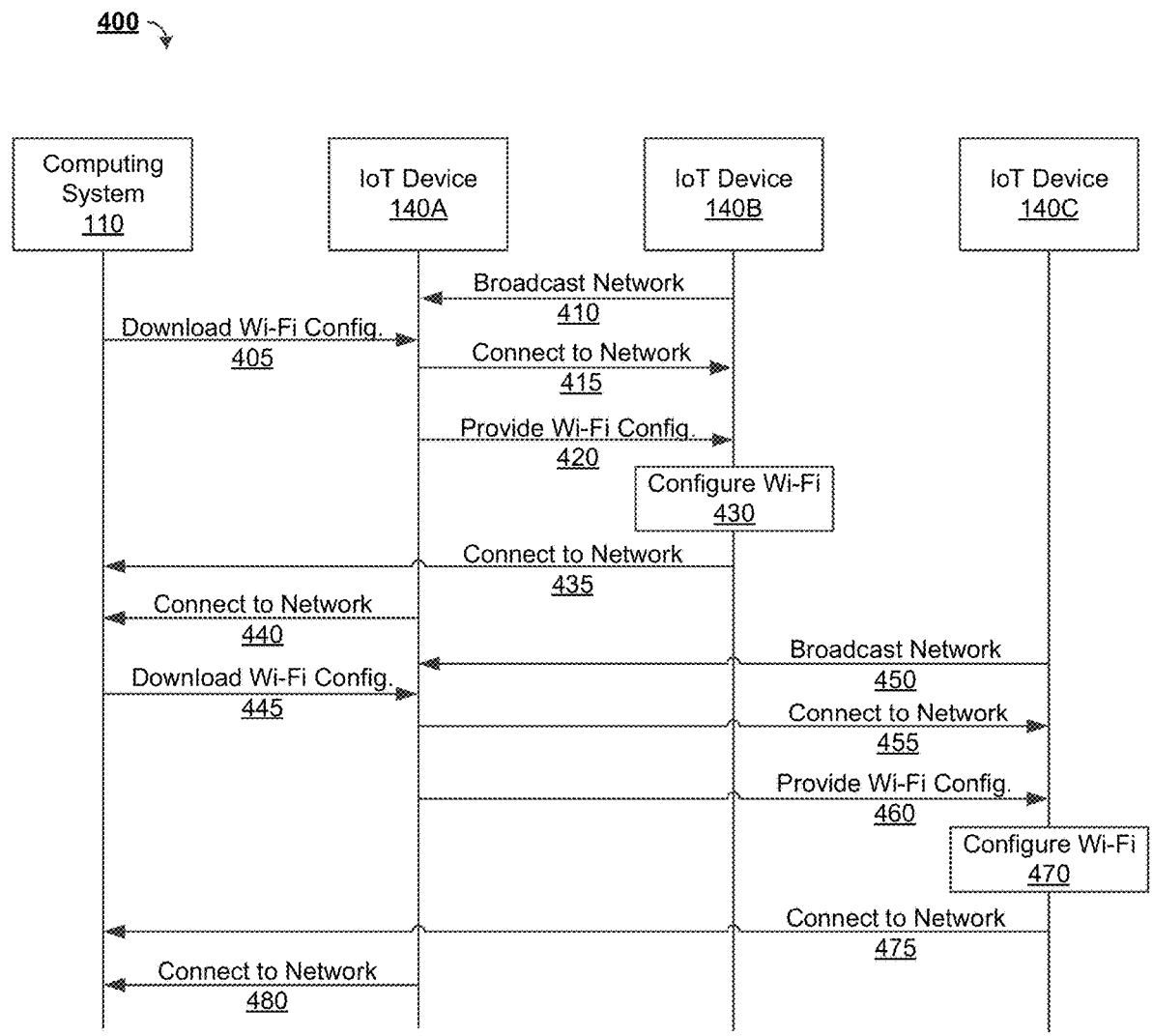
FIG. 4 depicts a message exchange for the setup of multiple IoT devices, in accordance with some example implementations.

As noted above, it can be desirable to set up more than one IoT device 140 at a time without setting up each IoT device 140 individually. FIG. 4 depicts a message exchange 400 for the setup of multiple IoT devices 140A-C, in accordance with some example implementations. In some aspects, at least a portion of the message exchange 400 can form at least a portion of a "fleet mode" setup protocol. As illustrated, the message exchange 400 can be among the computing system 110, the multiple IoT devices 140A-C of FIG. 1. However, additional and/or alternative devices/entities may be involved in the message exchange 400, such as one or more user access device 150. In some implementations, the message exchange 400 can occur in addition to at least a portion of the message exchange 200 of FIG. 2 (e.g., after completion of operational blocks 210-270 of FIG. 2). For example, after the first IoT device 140A is set up for communications with the computing system 110, the first IoT device 140A can scan and/or determine whether other IoT devices 140 are within range of the first IoT device 140A. Any information derived from this "discovery" procedure can be provided by the first IoT device 140A, to the computing system 110.

In some implementations, once the IoT device 140A is initially configured, it can become an automated version of the user access device 150A (e.g., similar to FIG. 2, albeit with less functionality) and/or can be configured to set up the other, nearby (e.g., within Wi-Fi range) IoT devices 140. In some aspects, the IoT device 140A may be provided with a list of IoT devices 140 to setup by the computing system 110 (e.g., as part of operation 280 of FIG. 2 and/or operation 405) and/or the user access device 150. In some aspects, the user access device 150 can scan for available networks (e.g., in the "discovery" phase) and/or store information related to the results of the scan. After scanning, the user access device 150 can provide information (e.g., SSID) on at least a portion of the available networks to the IoT device 140A to the IoT device 140A and/or the computing system 110 (e.g., as part of operation 290 or a separate operation). The information on other networks can be provided along with the configuration information (e.g., in operation 260) or at some time thereafter.

In order to track which IoT device 140 received what configuration information, a matchup can be performed through the user access device 150. In some aspects, the user access device 150 can provide a user interface for selection of which of the additional IoT devices 140 should be setup and according to what configuration information. In some aspects, the selection can be made at the user access device 150 before initiating the command for the IoT device 140A to set up additional IoT devices 140.

After the computing system 110 is aware of the additional IoT devices 140 in range, the computing system 110 can control/aid setup of the additional IoT devices 140. As illustrated, the message exchange 400 can include operational block 405, during which the computing system 110 can provide configuration information to the first IoT device 140A. In some aspects, operational block 405 can be similar to operational block 230 of FIG. 2. In some implementations, this configuration information can include information for setting up at least a second IoT device 140B. As illustrated, as part of operational block 410, the second IoT device 140B can advertise or otherwise provide its own network identity, which can be detected and/or identified by the first IoT device 140A. In some aspects, operational block 410 can be similar to operational block 240 of FIG. 2.

Subsequent to operational blocks 405-410 and as part of operational block 415, the first IoT device 140A can attempt to connect to the second IoT device 140B (e.g., via the network provided by the second IoT device 140B). In some aspects, operational block 415 can be similar to operational block 250 of FIG. 2. Once connected and as part of operational block 420, the first IoT device 140A can provide configuration information to the second IoT device 140B. In some aspects, operational block 420 can be similar to operational block 260 of FIG. 2. In some aspects, the configuration information comprises access information for at least one network (e.g., Wi-Fi).

After the second IoT device 140B receives the configuration information and as part of operational block 430, the second IoT device 140B can configure itself to access a network (e.g., Wi-Fi) provided in the configuration information. In some aspects, operational block 430 can be similar to operational block 265 of FIG. 2. After the second IoT device 140B configures itself and as part of operational block 435, the second IoT device 140B can connect to the network and/or communicate with the computing system 110. In some aspects, operational block 435 can be similar to operational block 270 of FIG. 2.

After the second IoT device 140B rescinds the network over which the first IoT device 140A provided the configuration information, the first IoT device 140A can connect back to the computing system 110 as part of operational block 440. In some aspects, operational block 440 can be similar to operational block 290 of FIG. 2. Once (re)connected, the first IoT device 140A can obtain additional configuration information as part of operational block 445. Thereafter, this configuration information can be used to setup the third IoT device 140C for network communications. For example, as illustrated, each of operational blocks 450, 455, 460, 470, 475, and 480 can occur in a manner similar to operational blocks 410, 415, 420, 430, 435, and 440, respectively, albeit from the perspective of the third IoT device 140C. In some aspects, operational block 445 may not be required and/or configuration information for the third IoT device 140C can be provided as part of operational block 405.

In some implementations, only the first IoT device 140A is designated for setting up additional IoT devices 140. However, in some implementations, other IoT devices 140 can be designated for setting up additional IoT devices 140, after they successfully communicate with the computing system 110. Depending on the number of IoT devices 140 intended to be set up, the time saved can grow exponentially per each additional IoT device 140 designated to provide configuration information to other IoT devices 140.

In some implementations, a user access device 150 can be utilized to control at least a portion of the message exchange protocol 400, prior to and/or during a portion of the message exchange protocol 400. For example, in some implementations, a user can be provided with a user interface similar to one or more of the user interfaces illustrated in FIGS. 18-20.

Figure 18:
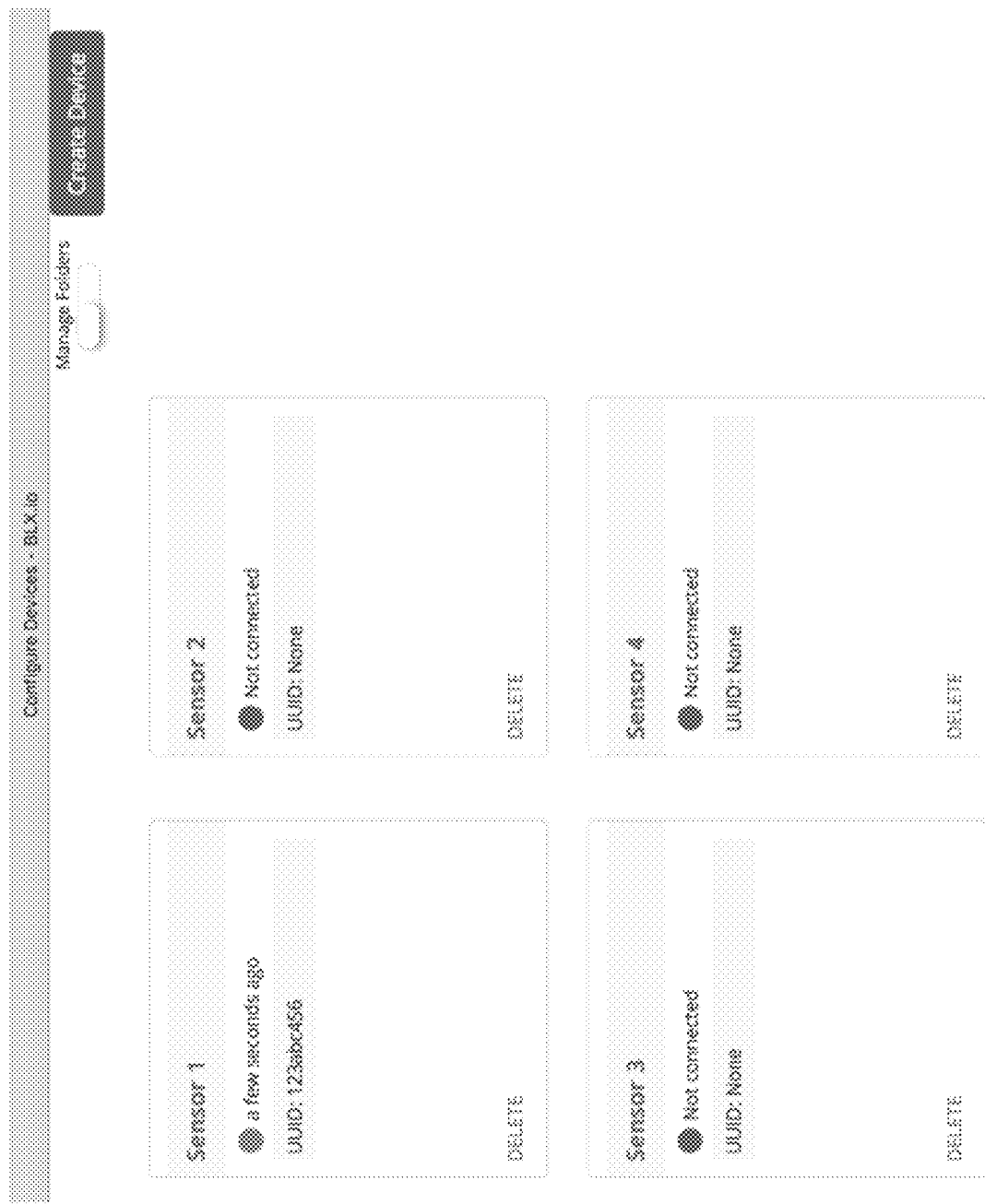
FIG. 18 depicts a user interface for managing configuration information, in accordance with some example implementations.

FIG. 18 depicts a user interface for managing configuration information, in accordance with some example implementations. As illustrated, there may be one IoT device 140A, for example (e.g., "Sensor 1") that was previously configured and/or has already been set up (e.g., via the message exchange 200 of FIG. 2). As further illustrated, additional IoT devices 140 (e.g., "Sensors 2-4") may have their configuration information entered (e.g., into a cloud server), through a user access device 150. In some implementations, the configuration information can include Wi-Fi networks to which each of the IoT devices 140 is to be connected.

Figure 19:
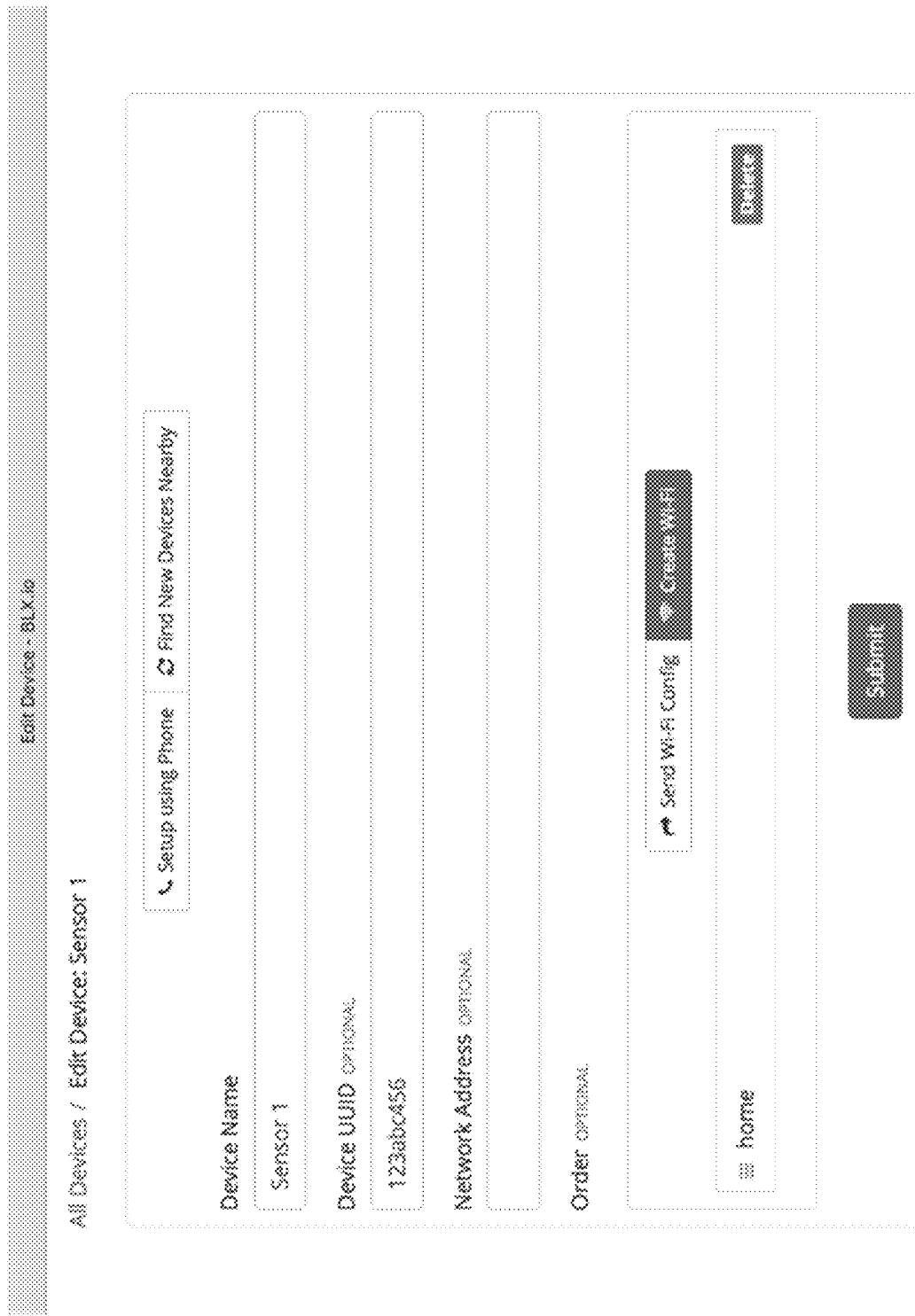
FIG. 19 depicts another user interface for providing configuration information, in accordance with some example implementations.

FIG. 19 depicts another user interface for providing configuration information, in accordance with some example implementations. In some implementations, a user selection of the "Find New Devices Nearby" button of device for an IoT device 140A, for example (e.g., "Sensor 1"), can cause the IoT device 140A to perform a scan for nearby devices. In various implementations, the IoT device 140A may already be set up (e.g., communicating over at least one network), and the setup of the IoT device 140A may have occurred at any point in time prior to the user selecting the "Find New Devices Nearby" button (e.g., months, days, hours, seconds). As part of the scan, the IoT device 140A may discover one or more new IoT devices 140 (e.g., "Sensor 2-4"), which a user may configure to perform one or more functions. In accordance with some implementations, the IoT device 140A can take the place of the user access device 150 and/or the user of the user access device 150, which would no longer require either to be at the site of the one or more new IoT devices 140 being set up. As such, once an IoT device 140 is set up, it can be used remotely to set up other IoT devices 140 within range.

Figure 20:
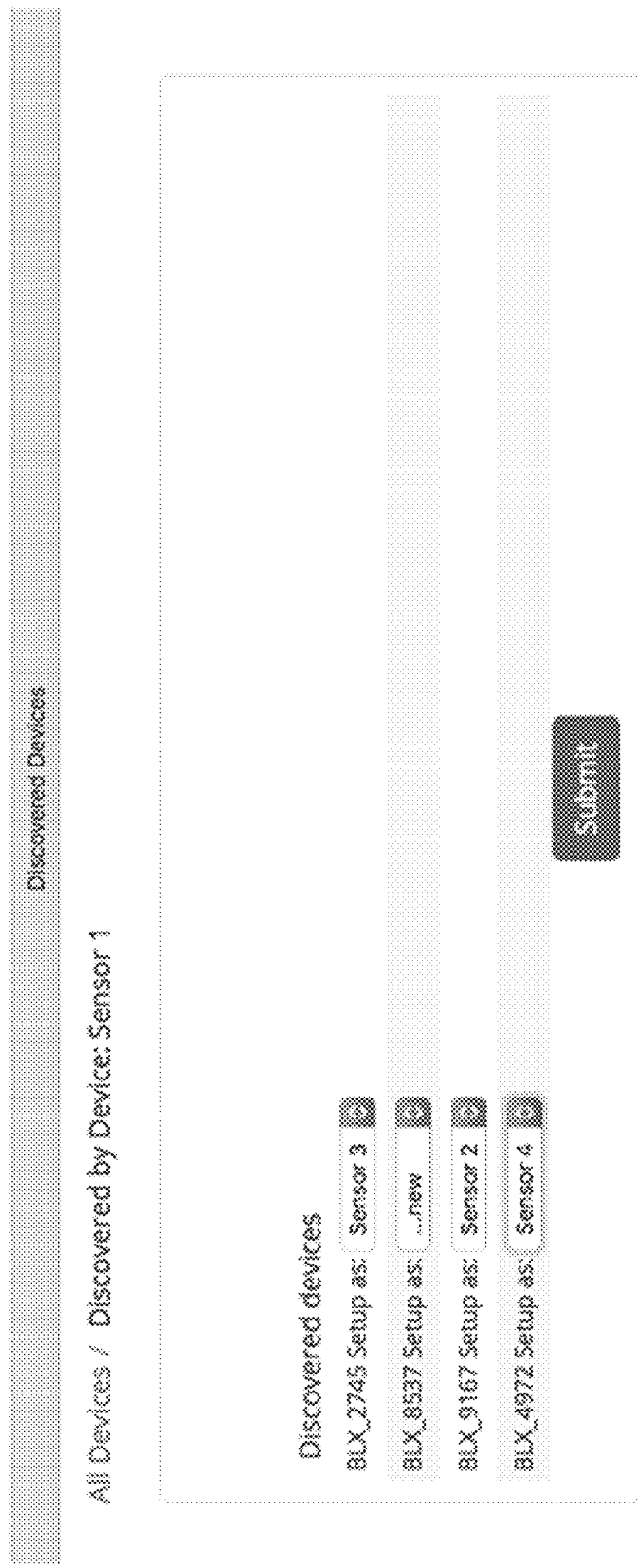
FIG. 20 depicts another user interface for managing and/or providing configuration information, in accordance with some example implementations.

FIG. 20 depicts another user interface for managing and/or providing configuration information, in accordance with some example implementations. As illustrated, the additional IoT devices 140, discovered by the scan performed by IoT device 140A, can be displayed for a user. In some implementations, the user can make selections to associate the discovered IoT devices 140 with a previously generated configuration profile, such as by selecting a configuration profile from a drop-down menu. In some aspects, configuration profiles can be set up to automatically match with IoT devices 140 being set up, such as by including some indication of an identifier of the IoT device 140 in the configuration profile. Such an identifier can include a universally unique identifier (UUID), serial number, model number, and/or the like. In some implementations, if an identifier of a discovered device matches an identifier in a previously generated configuration profile, then the user access device 150 (and/or the computing system 110) may identify a match. The match can be illustrated to the user by automatically displaying the configuration profile as selected (e.g., from a dropdown menu) for the discovered IoT device(s) 140. If a discovered IoT device 140 does not have a match or the user does not want to use a matched configuration profile, then the user can be allowed to generate a new configuration profile for any number of the IoT devices 140, such as by selecting a "new" entry from a drop-down menu. Upon indicating that the user wishes to create a new configuration profile, the user can be guided to an interface for entering the desired device configuration information, such as an interface similar to FIG. 10, FIG. 11, and/or FIG. 19.

Although various user interfaces are described herein with respect to a user access device 150, additional or alternative devices can provide the same or similar user interfaces, such as the computing system 110, an IoT device 140, and/or the like. Similarly, although some of the user interfaces described herein may function based on execution of software installed on a user access device 150, at least a portion of the functionality of the user interfaces can be controlled and/or aided by another device (e.g., as a backend), such as the computing system 110, some portion of the computing system 110, another entity in communication with the computing system 110, another user access device 150, an IoT device 140, and/or the like.

In various implementations, one or more of the user access device(s) 150, the computing system 110, the IoT device(s) 140, and/or the like can be configured for generating a user interface, such as the user interfaces illustrated and/or described. For example, in some aspects, the user access device 150B can be configured to execute code (e.g., stored in memory) to generate and/or provide (e.g., display) a user interface similar to the user interface illustrated in FIG. 10. Generating and/or providing the user interface can include displaying navigation information, such as the location of the current interface within a directory (e.g., illustrated as "All Devices/Edit Device: rp30"), a uniform resource location (URL) and/or associated information such as a page title (e.g., illustrated as "Edit Device—BLX.io"), and/or the like. Additionally or alternatively, generating and/or providing the user interface can include displaying fields for user entry of data and information associated with the fields, such as an indication of what information belongs in the fields (e.g., illustrated as "Device Name", "Device UUID", and "Network Address"), an indication of whether a field is required (e.g., illustrated as "OPTIONAL"), and/or the like.

Additionally or alternatively, generating and/or providing the user interface can include displaying user-selectable buttons (e.g., illustrated as "Refresh Flow Config", "Setup using Phone", "Send Wi-Fi Config", "Create Wi-Fi", "rrr", "Home", "Delete", and "Submit"). In response receiving a user selection of a displayed button, the user access device 150A can process the information, provide the information to another device for validation, generate and/or display another user interface, and/or the like. For example, if a user selects the "Submit" button without completing required fields, the user access device may identify this condition and direct the user to an interface (e.g., the same interface as FIG. 10 with additional and/or alternative information) explaining what the user must to do proceed.

In some aspects, the "=" button can be used to select an associated entry (e.g., the illustrated "rrr" entry can be selected through the user selecting the associated "=" button) and/or change the priority of the associated entry. For example, in some aspects, the "rrr" entry and the "Home" entry can be associated with one or more wireless networks (e.g., a Wi-Fi network with "rrr" as an SSID and another Wi-Fi network with "Home" as an SSID), and the illustration of "rrr" above "Home" can indicate a priority of the "rrr" network over the "Home" network. The priority of the networks can be stored as part of a configuration profile and/or utilized by an IoT device 140 to control the order in which the IoT device 140 initiates (or attempts to initiate) establishment. Once the IoT device 140 successfully establishes a connection with the highest priority network, the IoT device 140 can continue to attempt to establish connection(s) to any remaining networks identified within the configuration profile and/or provide feedback (e.g., to the computing system 110) indicative of whether or not each (or at least some) of the connections were successful. Additionally or alternatively, the IoT device 140 can be programmed to attempt to connect to lower priority networks (in the order of their priority) if higher priority network(s) are unavailable. Providing connection information for multiple networks can simplify the setup procedure for the IoT device 140 and provide one, simple setup mechanism for configuring an IoT device 140 to operate on any number of networks.

In order to add a wireless network to a configuration profile for an IoT device 140, a user may be provided with a button (e.g., "Create Wi-Fi") which, when selected, causes the user access device 150B to generate and/or provide a user interface that allows for entry of wireless network information (e.g., SSID, password, etc.). If a user has already added wireless network(s) (e.g., as part of generating a configuration profile for an IoT device 140), then selecting the "Create Wi-Fi" button can provide the user with an interface that allows for the selection of the previously added network(s).

If an IoT device 140 is already configured for communication over at least one network, then a user may be provided with a button (e.g., "Send Wi-Fi Config") to send an updated configuration profile, or some portion thereof, to the IoT device 140. After a user provides information to the user access device 150B for the configuration profile, the user may be allowed to select a "Submit" button to initiate the validation and/or storage of the configuration profile (e.g., for retrieval during configuration). After an IoT device 140 is provided with configuration information, the computing system 110, for example, can update a configuration profile for the IoT device 140 with additional information obtained during or after the configuration (e.g., during or after message exchange 200). For example, the computing system 110 can update the configuration profile for an IoT device 140 by including a device UUID and/or a network address for the IoT device 140.

Similar to the user access device 150B providing the user interface of FIG. 10, the user access device 150A may be configured to generate and/or provide (e.g., display) a user interface similar to the user interface of FIG. 11. Although not illustrated, the user interface of FIG. 11 can include additional fields, such as those illustrated in the lower half of FIG. 10.

In some aspects, the user access device 150A can provide a user with a button for initiating the transfer of a configuration profile to an IoT device 140. For example, in some aspects, as long as at least one network (and potentially a "Device Name") is included within the configuration profile, upon receiving a user selection of the "Setup using Phone" button, the user access device 150A can initiate setup of an IoT device 140 (e.g., step 220 of the message exchange 200 of FIG. 2). Additionally or alternatively, upon receiving a user selection of the "Setup using Phone" button, the user access device 150A can create a configuration profile itself (e.g., instead of receiving a configuration profile from the computing system 110) and generate and/or provide a user interface prompting the user to connect to an IoT device 140A (e.g., similar to FIG. 12).

In some aspects, a user access device 150 can generate and/or provide a user with a user interface for selecting stored configuration profiles, similar to the user interface of FIG. 18. In accordance with FIG. 18, the user access device 150 can display a user-selectable profile for each (or some subset thereof) of the stored configuration profiles. Each of the displayed profiles can be generated to include at least some of the information stored within the configuration profile (or otherwise obtained), such as a device name, a connection status, a connection time (e.g., how long ago the device was most recently connected), a UUID, a button to delete the profile, and/or the like. In some aspects, the user interface may only display a certain number (e.g., some subset) of stored configuration profiles, such that the information provided to a user is not overwhelming. In some aspects, the user access device 150 can generate and/or provide a button (e.g., the "Create Device" button) for allowing the user to add additional configuration profiles. Upon selection of the button, the user access device 150 can generate and/or provide a user with an interface for adding a configuration profile, such as FIG. 10, FIG. 11, FIG. 19, and/or the like. In some implementations, selection of a displayed profiled (e.g., by a user selection of the displayed device name), the user access device 150 can be configured to generate and/or provide an interface for adding a configuration profile, such as FIG. 10, FIG. 11, FIG. 19, and/or the like.

In some aspects, a user access device 150 can generate and/or provide a user with a button (e.g., illustrated as "Find New Devices Nearby" in FIG. 19) for initiating discovery of devices. Upon receiving a selection of the button, the user access device 150 can send a message (either directly or through an intermediary such as the computing system 110) to the IoT device 140 identified by the configuration profile (e.g., "Sensor 1" in FIG. 19) to initiate a search. In some aspects, a user access device 150 can be configured to include, as part of a user interface, the button for initiating discovery of devices after the IoT device 140 is setup (e.g., after receiving a proper UUID and/or network address). In some aspects, after receiving information about IoT devices 140 discovered within range of a previously configured IoT device 140, a user access device 150 can generate and/or provide a user with a user interface for associating each of the discovered IoT device 140 with stored configuration profiles. For example, in accordance with the user interface of FIG. 20, the user access device 150 can be configured to generate and/or provide a user interface with the same number of rows as devices discovered. As illustrated, each row can be generated to indicate a name of each IoT device 140 discovered and a selection mechanism (e.g., drop down menu) for selecting a stored configuration profile and/or generating a new configuration profile for each discovered IoT device 140.

Although specific messages are illustrated as occurring in a particular order, other orderings are possible. For example, in some aspects, the second and/or third IoT devices 140B-C can advertise or otherwise provide their own network information (e.g., identities) at any time prior to the first IoT device 140A attempting to provide information to the IoT devices 140B-C. Additionally or alternatively, the IoT device 140A may retrieve configuration information for the remainder of the IoT devices 140B-C at the beginning of the message exchange 400 and/or may not communicate with the computing system 110 until all of the IoT devices 140B-C are configured (or an attempt was made to configure each of the IoT devices 140B-C). Although three IoT device 140A-C are illustrated, in various implementations, more or less IoT devices 140A-D may be present.

Figure 5:
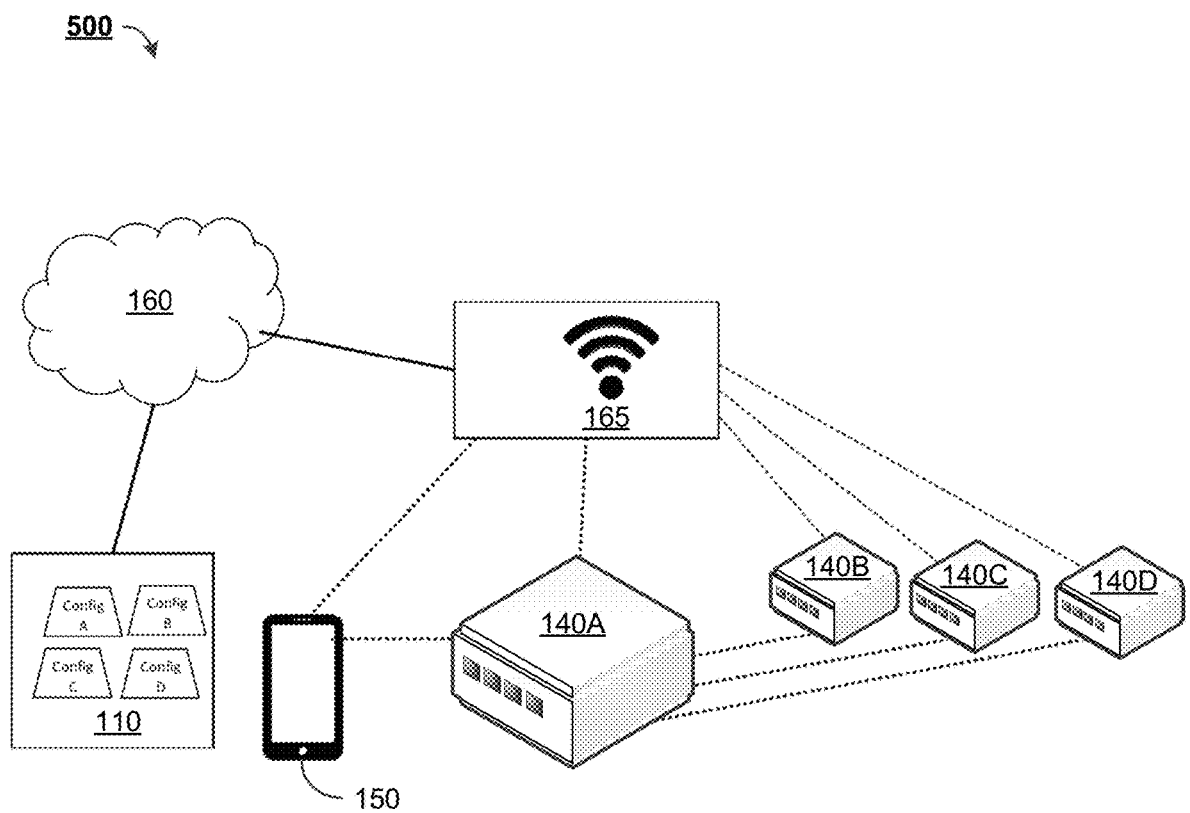
FIG. 5 depicts a system for setting up the IoT devices of FIG. 4, in accordance with some example implementations.

The message exchange 400 of FIG. 4 can be implemented within the system 100 of FIG. 1 and/or within another system. For example, FIG. 5 depicts a system 500 for setting up the IoT devices 140A-C of FIG. 4, in accordance with some example implementations. As illustrated, the user access device 150 may communicate with the computing system 110 via a first link, the IoT device 140A may communicate with the user access device 150 via a second link, and/or the IoT device 140A may communicate with the computing system 110 via a third link (e.g., for operational blocks 405, 440, 445, and/or 480). These links can be similar to the links of FIG. 3.

As further illustrated, the user IoT device 140A may communicate with other IoT devices 140B-D over separate links (e.g., for operational blocks 410, 415, 420, 450, 455, and/or 460), and/or each of the other IoT devices 140C-D may communicate with the computing system 110 via separate links (e.g., for operational blocks 435 and/or 475). The illustrated links can be wired and/or wireless. Although four IoT device 140A-D are illustrated, in various implementations, fewer or more IoT devices 140A-D may be present.

Figure 6:
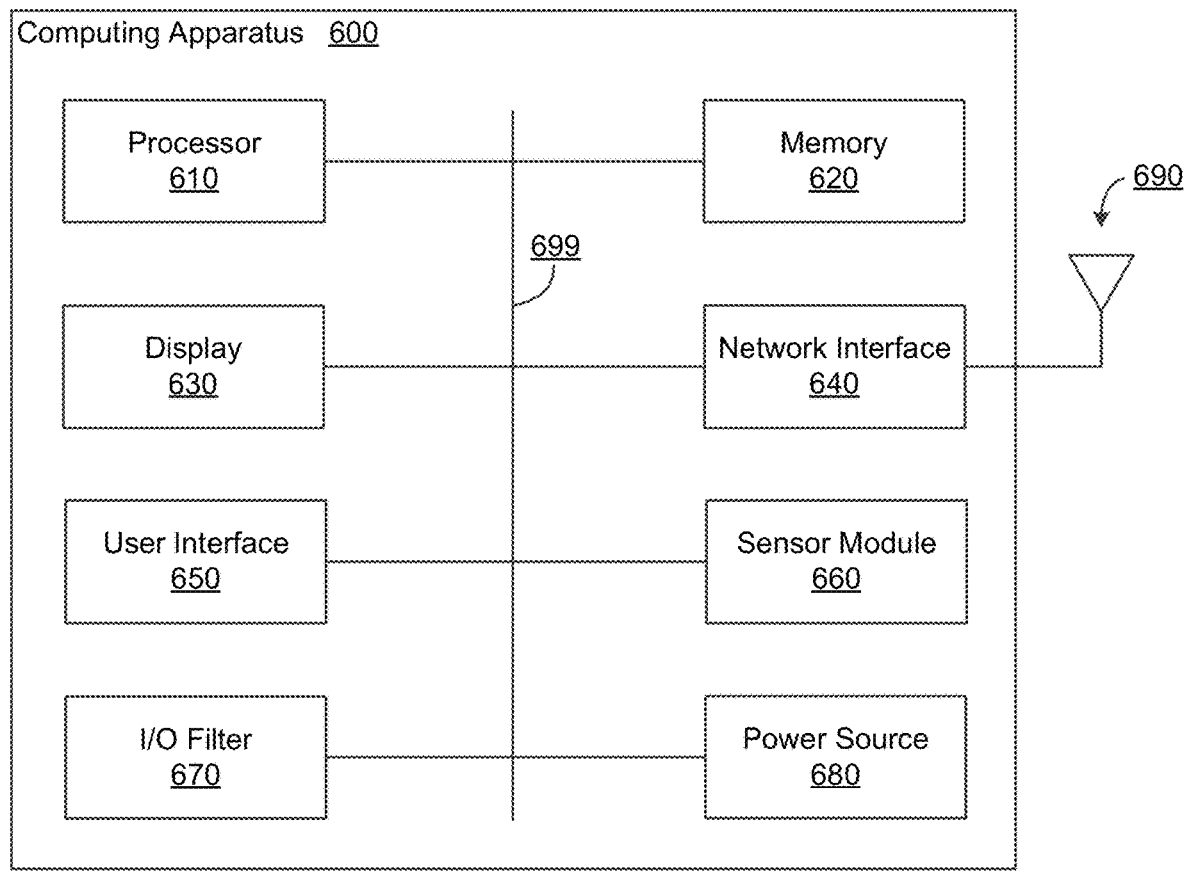
FIG. 6 depicts a block diagram of an example of a computing apparatus, in accordance with some example implementations.

FIG. 6 illustrates an example computing apparatus 600 which may be used to implement one or more of the described devices and/or components, in accordance with some example implementations. For example, at least a portion of the computing apparatus 600 may be used to implement at least a portion of the computing system 110, an apparatus providing the database 120, an apparatus providing the external software 130, one or more of the IoT devices 140, a user access device 150, and/or the network access device 165. Computing apparatus 600 may perform one or more of the processes described herein.

As illustrated, computing apparatus 600 may include one or more processors such as processor 610 to execute instructions that may implement operations consistent with those described herein. Apparatus 600 may include memory 620 to store executable instructions and/or information. Memory 620 may include solid-state memory, solid-state disk drives, magnetic disk drives, or any other information storage device. In some aspects, the memory 620 may provide storage for at least a portion of a database (e.g., the database 120 or some other organization of data). Apparatus 600 may include a network interface 640 to a wired network or a wireless network, such one or more of the networks 160, 170 of FIG. 1. Wireless networks may include Wi-Fi, WiMAX, LoRaWAN, cellular networks (2G/3G/4G/5G), and/or any other wireless network. In order to effectuate wireless communications, the network interface 640, for example, may utilize one or more antennas, such as antenna 680.

Apparatus 600 may include one or more user interface, such as user interface 650. The user interface 650 can include hardware or software interfaces, such as a keyboard, mouse, or other interface, some of which may include a touchscreen integrated with a display 630. The display 630 may be used to display information, provide prompts to a user, receive user input, and/or the like. In various implementations, the user interface 650 can include one or more peripheral devices and/or the user interface 650 may be configured to communicate with these peripheral devices.

In some aspects, the user interface 650 may include one or more of the sensors described herein and/or may include an interface to one or more of the sensors described herein. The operation of these sensors may be controlled at least in part by a sensor module 660. The apparatus 600 may also comprise and input and output filter 670, which can filter information received from the sensors or other user interfaces, received and/or transmitted by the network interface, and/or the like. For example, signals detected through sensors can be passed through the filter 670 for proper signal conditioning, and the filtered data may then be passed to the microcontroller sensor module 660 and/or processor 610 for validation and processing (e.g., before transmitting results or an indication via the network interface 640). The apparatus 600 may be powered through the use of one or more power sources, such as power source 690. As illustrated, one or more of the components of the apparatus 600 may communicate and/or receive power through a system bus 699.

FIG. 7 illustrates a flowchart of a method 700 for configuration for IoT device setup, in accordance with some example implementations. In various implementations, the method 700 (or at least a portion thereof) may be performed by one or more of the computing system 110, an apparatus providing the database 120, an apparatus providing the external software 130, a user access device 150, one or more of the IoT devices 140, the access device 165, the computing apparatus 600, other related apparatuses, and/or some portion thereof.

Method 700 can start at operational block 710 where the apparatus 600, for example, can receive data associated with a first wireless network. In some aspects, the data can be received from an intermediary device, such as a user access device 150. In some implementations, the data can include an identifier of the first wireless network, a password for the first wireless network, one or more keys for the first wireless network, one or more keys for an Internet of Things device configured to communicate over the first wireless network, and/or the like. In some aspects, the first wireless network comprises a Wi-Fi network provided by a Wi-Fi access point. In some implementations, the first wireless network comprises a LoRaWAN.

Method 700 can proceed to operational block 720 where the apparatus 600, for example, can generate a configuration profile for establishing a connection from at least one IoT device to the first wireless network, the configuration profile comprising the information identifying the first wireless network. In some aspects, the configuration profile is generated in response to receiving, from an intermediary device or another device, data indicative of data indicative of at least one of the identifier of the first wireless network, the password for the first wireless network, the one or more keys for the first wireless network, the one or more keys for the Internet of Things device, and/or the like.

Method 700 can proceed to operational block 730 where the apparatus 600, for example, can receive, from an intermediary device, a request to initiate establishment of the connection. In some aspects, the intermediary device can be the same device or a different device from the device that provides the data associated with the first wireless network.

Method 700 can proceed to operational block 740 where the apparatus 600, for example, can provide the configuration profile for access by the intermediary device. In some aspects, the configuration profile is provided in response to the request. In some implementations, providing the configuration profile can include transmitting the configuration profile to the intermediary device and/or providing the configuration profile for the intermediary device to download.

Method 700 can proceed to operational block 750 where the apparatus 600, for example, can receive a message comprising identification and/or capability information for the at least one IoT device.

Method 700 can proceed to operational block 760 where the apparatus 600, for example, can receive information indicative of a successful establishment of the connection. This information can be provided by the intermediary device and/or the Internet of Things device.

Method 700 can proceed to operational block 770 where the apparatus 600, for example, can transmit at least one packet of data to the at least one IoT device. In some implementations, the transmission of the at least one packet is over the first network. In some implementations, the at least one packet comprises network data, such as user data or control information.

Performance of the method 700 and/or a portion thereof can require less effort on behalf of a user, which can lead to a better user experience. Similarly, performance of at least a portion of the method 700 can provide quicker and/or more autonomous setup for any number of IoT devices.

FIG. 8 illustrates a flowchart of another method 800 for configuration for IoT device setup, in accordance with some example implementations. In various implementations, the method 800 (or at least a portion thereof) may be performed by one or more of the computing system 110, an apparatus providing the database 120, an apparatus providing the external software 130, a user access device 150, one or more of the IoT devices 140, the access device 165, the computing apparatus 600, other related apparatuses, and/or some portion thereof.

Method 800 can start at operational block 810 where the apparatus 600, for example, can provide, to a server, a request for a configuration profile for setup of an Internet of Things device over a first wireless network. In some aspects, the configuration profile can include an identifier of the first wireless network, a password for the first wireless network, one or more keys for the first wireless network, one or more keys for the Internet of Things device, and/or the like. In some aspects, the configuration profile is generated at the server in response to receiving, from the intermediary device or another device, data indicative of at least one of the identifier of the first wireless network, the password for the first wireless network, the one or more keys for the first wireless network, the one or more keys for the Internet of Things device, and/or the like. In some implementations, the request is provided in response to detecting, at the apparatus, a selection of a displayed indication of the configuration profile (e.g., detecting a user touch selecting a button associated with the configuration profile). In some aspects, the first wireless network comprises a Wi-Fi network provided by a Wi-Fi access point. In some implementations, the first wireless network comprises a LoRaWAN.

Method 800 can proceed to operational block 820 where the apparatus 600, for example, can receive the configuration profile from the server. In some implementations, the configuration profile is received in response to the request. In some implementations, the configuration profile can be stored at the apparatus 600. For example, the configuration profile can be stored as a local variable in a web browser application running on the apparatus 600.

Method 800 can proceed to operational block 830 where the apparatus 600, for example, can establish a connection to a second wireless network provided by the Internet of Things device. In some aspects, the second wireless network comprises a Wi-Fi network provided by the Internet of Things device.

Method 800 can proceed to operational block 840 where the apparatus 600, for example, can receive, from the Internet of Things device, communication settings and/or capabilities for the Internet of Things device.

Method 800 can proceed to operational block 850 where the apparatus 600, for example, can provide, over the second wireless network, the configuration profile to the Internet of Things device. In some implementations, providing the configuration profile to the Internet of Things device causes the Internet of Things device to automatically establish (e.g., in response to receiving the configuration profile and/or without user intervention) a connection to the first wireless network.

Method 800 can proceed to operational block 860 where the apparatus 600, for example, can determine that the second wireless network is unavailable. In some implementations, the second network can become unavailable when the Internet of Things device stops providing the second wireless network (e.g., as part of connecting or attempting to connect to the first wireless network, or after connecting to the first wireless network). Additionally or alternatively, the apparatus 600 can receive an indication from the Internet of Things device (or a server) that the Internet of Things device has successfully established a connection with the first wireless network and/or a sever (e.g., computing system 110) over the first wireless network. In some aspects, the apparatus 600 may understand that the IoT device's connection to the network(s) identified in the configuration profile was successful through other means, and/or may not need to expressly determine that the second wireless network is unavailable.

Method 800 can proceed to operational block 870 where the apparatus 600, for example, can transmit, to the server, the communication settings and/or capabilities for the Internet of Things device. In some implementations, the transmission of the settings and/or capabilities can be in response to determining that the second wireless network is unavailable. Additionally or alternatively, the transmission of the settings and/or capabilities can be in response to receiving an indication from the Internet of Things device (or a server) that the Internet of Things device has successfully established a connection with the first wireless network and/or a sever.

Performance of the method 800 and/or a portion thereof can require less effort on behalf of a user, which can lead to a better user experience. Similarly, performance of at least a portion of the method 800 can provide quicker and/or more autonomous setup for any number of IoT devices.

Figure 9:
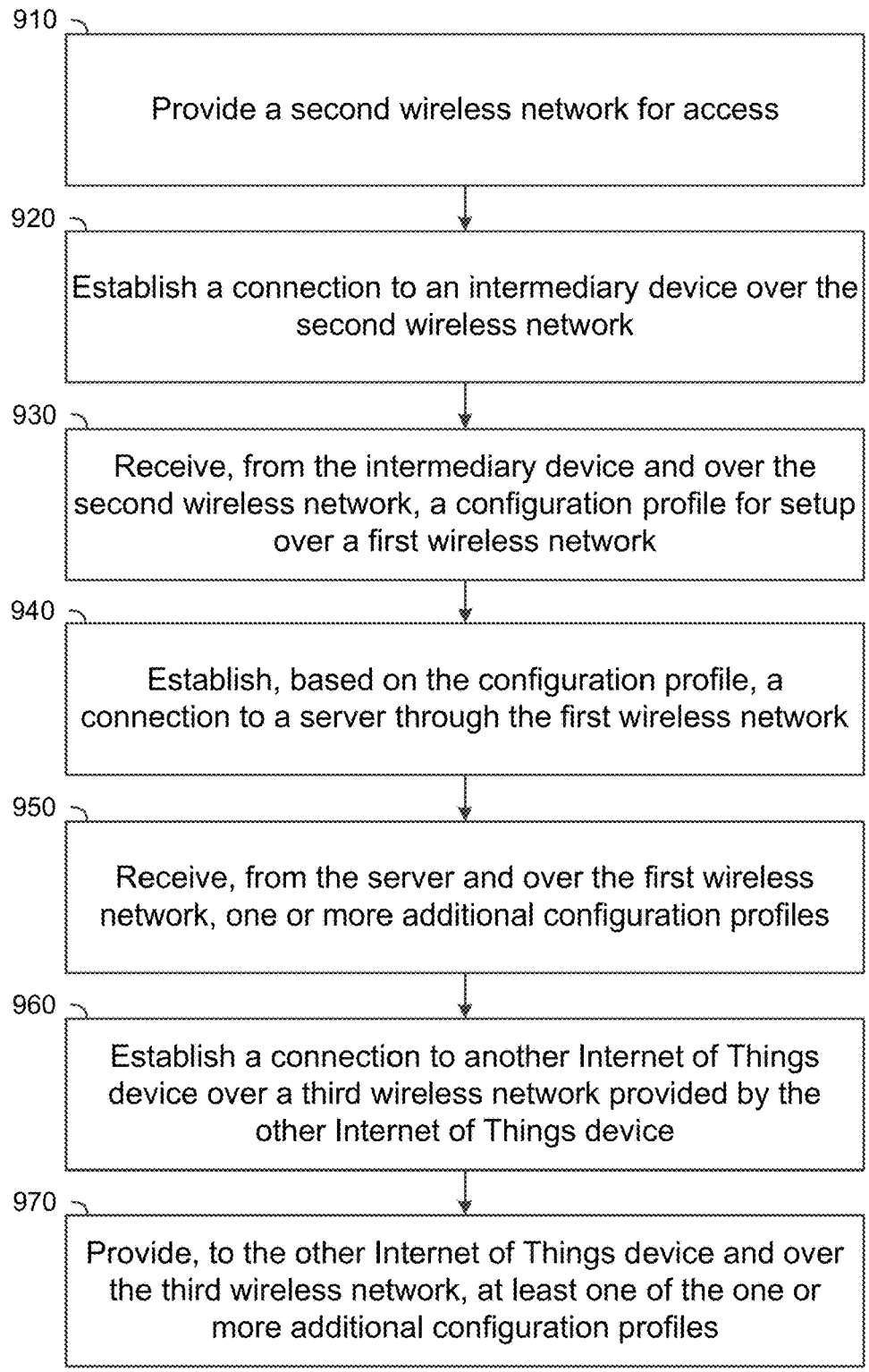
FIG. 9 depicts another example of a method for configuration for IoT device setup, in accordance with some example implementations.

FIG. 9 illustrates a flowchart of another method 900 for configuration for IoT device setup, in accordance with some example implementations. In various implementations, the method 900 (or at least a portion thereof) may be performed by one or more of the computing system 110, an apparatus providing the database 120, an apparatus providing the external software 130, a user access device 150, one or more of the IoT devices 140, the access device 165, the computing apparatus 600, other related apparatuses, and/or some portion thereof.

Method 900 can start at operational block 910 where the apparatus 600, for example, can provide a second wireless network for access. In some aspects, the second wireless network comprises a Wi-Fi network provided by the apparatus 600.

Method 900 can proceed to operational block 920 where the apparatus 600, for example, can establish a connection to an intermediary device over the second wireless network. Although establishment of the connection to the intermediary device is described from the perspective of the apparatus 600, the intermediary device can additionally or alternatively initiate establishment of a connection to the apparatus 600.

Method 900 can proceed to operational block 930 where the apparatus 600, for example, can receive, from the intermediary device and over the second wireless network, a configuration profile for setup over a first wireless network. In some aspects, the configuration profile can include an identifier of the first wireless network, a password for the first wireless network, one or more keys for the first wireless network, one or more keys for the Internet of Things device, and/or the like. In some aspects, the configuration profile is generated at the server in response to receiving data indicative of at least one of the identifier of the first wireless network, the password for the first wireless network, the one or more keys for the first wireless network, the one or more keys for the Internet of Things device, and/or the like. In some aspects, the first wireless network comprises a Wi-Fi network provided by a Wi-Fi access point. In some implementations, the first wireless network comprises a LoRaWAN. In some implementations, the method 900 can additionally or alternatively include the apparatus 600 terminating, in response to receiving the configuration profile, the second wireless network.

Method 900 can proceed to operational block 940 where the apparatus 600, for example, can establish, based on the configuration profile, a connection to a server through the first wireless network (e.g., through a Wi-Fi network that provides access to the Internet, wherein the server is accessible over the Internet). In some implementations, the server can be the same server that generated the configuration profile. Additionally or alternatively, the method 900 can include the apparatus 600 providing, to the server via the first wireless network, an indication of successful establishment of the connection to the first wireless network. In some implementations, the method 900 can additionally or alternatively include the apparatus 600 transmitting, to an access point of the first wireless network, a request to join the first wireless network.

Method 900 can proceed to operational block 950 where the apparatus 600, for example, can receive, from the server and over the first wireless network, one or more additional configuration profiles. In some implementations, receiving the one or more additional configuration profiles can enable the Internet of Things device to establish a connection to any of the one or more additional wireless networks (e.g., in addition to or instead of the first wireless network). In some implementations, the one or more additional configuration profiles are for setup of one or more additional Internet of Things devices. In some aspects, the one or more additional configuration profiles can be received earlier, such as during operational block 930.

Method 900 can proceed to operational block 960 where the apparatus 600, for example, can establish a connection to another Internet of Things device over a third wireless network provided by the other Internet of Things device. In some implementations, the third wireless network comprises a Wi-Fi network provided by the other Internet of Things device. In some aspects, providing the one or more configuration profiles to the other Internet of Things device causes the other Internet of Things device to establish a connection to the first wireless network or another wireless network indicated by the one or more configuration profiles Method 900 can proceed to operational block 970 where the apparatus 600, for example, can provide, to the other Internet of Things device and over the third wireless network, at least one of the one or more additional configuration profiles. In some implementations, providing the at least one of the one or more configuration profiles to the other Internet of Things device causes the other Internet of Things device to establish a connection to the first wireless network or another wireless network indicated by the one or more configuration profiles.

In some implementations, the method 900 can additionally or alternatively include the apparatus 600 providing (e.g., transmitting), to the intermediary device and/or the server, communication settings and/or capabilities for the apparatus 600.

Performance of the method 900 and/or a portion thereof can require less effort on behalf of a user, which can lead to a better user experience. Similarly, performance of at least a portion of the method 900 can provide quicker and/or more autonomous setup for any number of IoT devices.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic input, speech input, tactile input, and/or the like. Other possible input devices include touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such phrases are intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." The use of the term "based on," above and in the claims is intended to mean "based at least in part on," such that a feature or element that is not recited is also permissible.

The illustrated methods are exemplary only. Although the methods are illustrated as having a specific operational flow, two or more operations may be combined into a single operation, a single operation may be performed in two or more separate operations, one or more of the illustrated operations may not be present in various implementations, and/or additional operations which are not illustrated may be part of the methods. In addition, the logic flows depicted in the accompanying figures and/or described herein do not necessarily require the particular order shown, or sequential order, to achieve desirable results. Other implementations may be within the scope of the following claims.

What is claimed is:

1. A system comprising:
   at least one processor; and
   at least one memory storing instructions which, when executed by the at least one processor,
   cause operations comprising:
   receiving, by an intermediary device and from at least one server via an initial connection, a first configuration information for setup of an Internet of Things device, the first configuration information comprising an identifier of a first wireless network;
   storing, by the intermediary device, the first configuration information in a context of a browser of the intermediary device;
   establishing, by the intermediary device and after receiving the first configuration information, a second connection to a second wireless network provided by the Internet of Things device;
   switching, by the intermediary device, from the initial connection to the second connection to the second wireless network provided by the Internet of Things device; and
   providing, by the intermediary device using the browser storing the context, the first configuration information, which is stored in the context of the browser of the intermediary device, to the Internet of Things device via the second connection to the second wireless network, wherein providing the first configuration information to the Internet of Things device causes the Internet of Things device to automatically establish a first connection to the first wireless network;
   terminating, at the Internet of Things device and in response to receiving the configuration information, the second wireless network;
   transmitting, by the Internet of Things device, to an access point of the first wireless network, a request to join the first wireless network; and
   in response to joining the first wireless network and accessing the at least one server, receiving, from the server, by the Internet of Things device, second configuration information, based in part on communication settings and/or capabilities of the Internet of Things device, providing additional configuration information for the Internet of Things device.

2. The system of claim 1, wherein automatically establishing the first connection to the first wireless network comprises:
   receiving, at the Internet of Things device, the first configuration information over the second connection to the second wireless network; and
   attempting, by the Internet of Things device and in response to receiving the first configuration information, to establish the first connection to the first wireless network without user intervention, the first connection separate from the initial connection.

3. The system of claim 1, wherein the first configuration information is generated at the at least one server in response to receiving, from the intermediary device or another device, data indicative of at least the identifier of the first wireless network.

4. The system of claim 1, wherein the operations further comprise:
   providing, by the intermediary device and to the at least one server, a request for the first configuration information, wherein the first configuration information is received in response to the request.

5. The system of claim 4, wherein the request is provided in response to detecting, via a user interface at the intermediary device, a selection of the first configuration information.

6. The system of claim 1, wherein the operations further comprise:
providing, by the Internet of Things device and to the at least one server via the first wireless network, an indication of successful establishment of the first connection to the first wireless network; and
receiving, at the Internet of Things device and from the at least one server in response to the indication, one or more additional configuration information for one or more additional wireless networks, wherein receiving the one or more additional configuration information enables the Internet of Things device to establish a third connection to any of the one or more additional wireless networks.

7. The system of claim 1, wherein the operations further comprise:
receiving, at the intermediary device and from the Internet of Things device, communication settings and/or capabilities for the Internet of Things device;
determining, at the intermediary device, that the second wireless network is unavailable; and
transmitting, by the intermediary device and to the at least one server in response to detecting that the second wireless network is unavailable, the communication settings and/or capabilities for the Internet of Things device.

8. The system of claim 1, wherein the operations further comprise:
receiving, at the Internet of Things device, one or more configuration information for setup of a plurality of Internet of Things devices;
establishing, by the Internet of Things device, a third connection to a third wireless network provided by another Internet of Things device of the plurality of Internet of Things devices; and
providing, by the Internet of Things device and over the third wireless network, the one or more configuration information to the other Internet of Things device, wherein providing the one or more configuration information to the other Internet of Things device causes the other Internet of Things device to establish a fourth connection to the first wireless network or another wireless network indicated by the one or more configuration information.

9. The system of claim 1, wherein the intermediary device comprises a user equipment, wherein the first wireless network comprises a Wi-Fi network provided by a Wi-Fi access point, and wherein the second wireless network comprises another Wi-Fi network provided by the Internet of Things device.

10. The system of claim 1, wherein the first wireless network comprises a wireless local network provided by an access point, and wherein the second wireless network comprises a hotspot provided by the Internet of Things device.

11. A method comprising:
receiving, by an intermediary device and from at least one server via an initial connection, a first configuration information for setup of an Internet of Things device, the first configuration information comprising an identifier of a first wireless network;
storing, by the intermediary device, the first configuration information in a context of a browser of the intermediary device;
establishing, by the intermediary device and after receiving the first configuration information, a second connection to a second wireless network provided by the Internet of Things device;
switching, by the intermediary device, from the initial connection to the second connection to the second wireless network provided by the Internet of Things device; and
providing, by the intermediary device using the browser storing the context, the first configuration information of the browser of the intermediary device to the Internet of Things device via the second connection to the second wireless network, wherein providing the first configuration information to the Internet of Things device causes the Internet of Things device to automatically establish a first connection to the first wireless network;
terminating, at the Internet of Things device and in response to receiving the configuration information, the second wireless network;
transmitting, by the Internet of Things device to an access point of the first wireless network, a request to join the first wireless network; and
in response to joining the first wireless network and accessing the at least one server, receiving, from the server, by the Internet of Things device, second configuration information, based in part on communication settings and/or capabilities of the Internet of Things device, providing additional configuration information for the Internet of Things device.

12. The method of claim 11, wherein automatically establishing the first connection to the first wireless network comprises:
receiving, at the Internet of Things device, the first configuration information over the second connection to the second wireless network; and
attempting, by the Internet of Things device and in response to receiving the first configuration information, to establish the first connection to the first wireless network without user intervention, the first connection separate from the initial connection.

13. The method of claim 11, wherein the first configuration information is generated at the at least one server in response to receiving, from the intermediary device or another device, data indicative of at least the identifier of the first wireless network.

14. The method of claim 11, further comprising:
providing, by the intermediary device and to the at least one server, a request for the first configuration information, wherein the first configuration information is received in response to the request.

15. The method of claim 14, wherein the request is provided in response to detecting, via a user interface at the intermediary device, a selection of the first configuration information.

16. The method of claim 11, further comprising:
providing, by the Internet of Things device and to the at least one server via the first wireless network, an indication of successful establishment of the first connection to the first wireless network; and
receiving, at the Internet of Things device and from the at least one server in response to the indication, one or more additional configuration information for one or more additional wireless networks, wherein receiving the one or more additional configuration information enables the Internet of Things device to establish a third connection to any of the one or more additional wireless networks.

17. The method of claim 11, further comprising:
receiving, at the intermediary device and from the Internet of Things device, communication settings and/or capabilities for the Internet of Things device;
determining, at the intermediary device, that the second wireless network is unavailable; and
transmitting, by the intermediary device and to the at least one server in response to detecting that the second wireless network is unavailable, the communication settings and/or capabilities for the Internet of Things device.

18. The method of claim 11, further comprising:
receiving, at the Internet of Things device, one or more configuration information for setup of a plurality of Internet of Things devices;
establishing, by the Internet of Things device, a third connection to a third wireless network provided by another Internet of Things device of the plurality of Internet of Things devices; and
providing, by the Internet of Things device and over the third wireless network, the one or more configuration information to the other Internet of Things device, wherein providing the one or more configuration information to the other Internet of Things device causes the other Internet of Things device to establish a fourth connection to the first wireless network or another wireless network indicated by the one or more configuration information.

19. A non-transitory computer-readable medium comprising instructions which, when executed by at least one processor, cause operations comprising:
receiving, by an intermediary device and from at least one server via an initial connection, a first configuration information for setup of an Internet of Things device, the first configuration information comprising an identifier of a first wireless network;
storing, by the intermediary device, the first configuration information in a context of a browser of the intermediary device;
establishing, by the intermediary device and after receiving the first configuration information, a second connection to a second wireless network provided by the Internet of Things device;
switching, by the intermediary device, from the initial connection to the second connection to the second wireless network provided by the Internet of Things device; and
providing, by the intermediary device using the browser storing the context, the first configuration information, which is stored in the context of the browser of the intermediary device, to the Internet of Things device via the second connection to the second wireless network, wherein providing the first configuration information to the Internet of Things device causes the Internet of Things device to automatically establish a first connection to the first wireless network;
terminating, at the Internet of Things device and in response to receiving the configuration information, the second wireless network;
transmitting, by the Internet of Things device to an access point of the first wireless network, a request to join the first wireless network; and
in response to joining the first wireless network and accessing the at least one server, receiving, from the server, by the Internet of Things device, second configuration information, based in part on communication settings and/or capabilities of the Internet of Things device, providing additional configuration information for the Internet of Things device.

* * * * *